United States Patent
Frank et al.

(10) Patent No.: US 10,979,432 B1
(45) Date of Patent: Apr. 13, 2021

(54) HOSTED COMMUNICATION CHANNELS ON COMMUNICATION PLATFORM

(71) Applicant: Slack Technologies, Inc., San Francisco, CA (US)

(72) Inventors: Ilan Frank, Los Altos, CA (US); Shanan Delp, San Francisco, CA (US); Michael Demmer, San Francisco, CA (US); Sri Vasamsetti, San Francisco, CA (US); Neha Sharma, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 16/918,421

(22) Filed: Jul. 1, 2020

Related U.S. Application Data

(60) Provisional application No. 63/042,927, filed on Jun. 23, 2020.

(51) Int. Cl.
| | | |
|---|---|---|
| *G06F 21/42* | (2013.01) | |
| *G06F 21/71* | (2013.01) | |
| *H04L 29/06* | (2006.01) | |
| *H04L 7/10* | (2006.01) | |

(52) U.S. Cl.
CPC ............... *H04L 63/101* (2013.01)

(58) Field of Classification Search
None
See application file for complete search history.

(56) References Cited

U.S. PATENT DOCUMENTS

| | | | | |
|---|---|---|---|---|
| 2004/0243640 | A1* | 12/2004 | Bostleman | G06Q 10/10 |
| 2013/0007851 | A1* | 1/2013 | Robbins | H04L 63/10 |
| | | | | 726/4 |
| 2014/0089060 | A1* | 3/2014 | Berty | G06Q 10/06393 |
| | | | | 705/7.39 |

(Continued)

OTHER PUBLICATIONS

Enterprise Collaboration Management with Intraspect. Gruber, Tom. Intraspect White Paper. (Year: 2001).*

(Continued)

*Primary Examiner* — Venkat Perungavoor
(74) *Attorney, Agent, or Firm* — Lee & Hayes, P.C.

(57) ABSTRACT

Hosted communication channels associated with a communication platform are described. In an example, a user can utilize communication services available via a communication platform. In some examples, a first organization can invite a second organization to join a communication channel. The two organizations can be different such that they are associated with different organization identifiers and are associated with different permissions. In some examples, content associated with each organization can be private, such that other organizations cannot access content that is owned or otherwise managed by each organization. However, content posted to shared communication channels can be accessed, viewed, interacted with, or the like by any member of the shared communication channels. To address privacy and/or security concerns, some organizations or users of the communication platform may desire to control how end users that join a shared communication channel interact with the shared communication channel.

20 Claims, 11 Drawing Sheets

(56) References Cited

U.S. PATENT DOCUMENTS

| | | | | |
|---|---|---|---|---|
| 2014/0379416 | A1* | 12/2014 | Ristock | G06Q 10/0633 |
| | | | | 705/7.27 |
| 2015/0106142 | A1* | 4/2015 | Ristock | G06Q 10/06311 |
| | | | | 705/7.12 |
| 2016/0057120 | A9* | 2/2016 | Kravitz | H04L 67/125 |
| | | | | 713/171 |
| 2016/0100019 | A1* | 4/2016 | Leondires | H04L 63/105 |
| | | | | 709/204 |
| 2016/0275458 | A1* | 9/2016 | Meushar | G06Q 10/1095 |
| 2017/0103432 | A1* | 4/2017 | Borchetta | G06Q 30/0279 |
| 2017/0243017 | A1* | 8/2017 | Angelo | G06F 16/176 |
| 2017/0339215 | A1* | 11/2017 | Chan | G06F 16/176 |
| 2018/0145840 | A1* | 5/2018 | Advani | H04L 51/32 |
| 2018/0287982 | A1 | 10/2018 | Draeger et al. | |
| 2019/0332807 | A1* | 10/2019 | LaFever | G06F 21/6254 |

OTHER PUBLICATIONS

End-User Controlled Group Formation and Access Rights Management in a Shared Workspace System. Haake et al. ACM. (Year: 2004).*

Global permissions in Project Server 2013. (Year: 2013).*

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013, 1:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), LEXISNEXIS, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, LEXISNEXIS, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", FUJITSU Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, LEXISNEXIS, https://advance.lexis.com/api/permalink/96268e3f-26ad-48ac-a98f-6c39804ebded/?context=1000516, (dated Mar. 4, 2014) 3 pages.

* cited by examiner

HOSTED COMMUNICATION CHANNELS ON COMMUNICATION PLATFORM

PRIORITY

This application claims priority to U.S. Provisional Application No. 63/042,927, filed Jun. 23, 2020, the entire contents of which are incorporated by reference herein.

TECHNICAL FIELD

A communication platform can leverage a network-based computing system to enable users to exchange data. In an example, users of the communication platform can communicate with other users via communication channels (or "channels"). A communication channel, or other virtual space, can be a data route used for exchanging data between and among systems and devices associated with the communication platform. For example, a communication channel may be established between and among various user computing devices, allowing the user computing devices to communicate and share data between and among each other over one or more networks. That is, in some examples, the communication platform can be a channel-based messaging platform and/or hub for facilitating communication between and among users. In some examples, data associated with a communication channel can be presented via a user interface. In some examples, the user interface can present a data feed indicating messages posted to and/or actions taken with respect to a particular communication channel.

In some examples, a communication channel can be shared by two or more organizations, which can introduce privacy and security concerns. That is, because the communication channel is accessible to users who are part of different organizations (i.e., and, typically, are not privy to information outside of their own organizations), some organizations opt not to use shared communication channels because of such privacy and security concerns.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
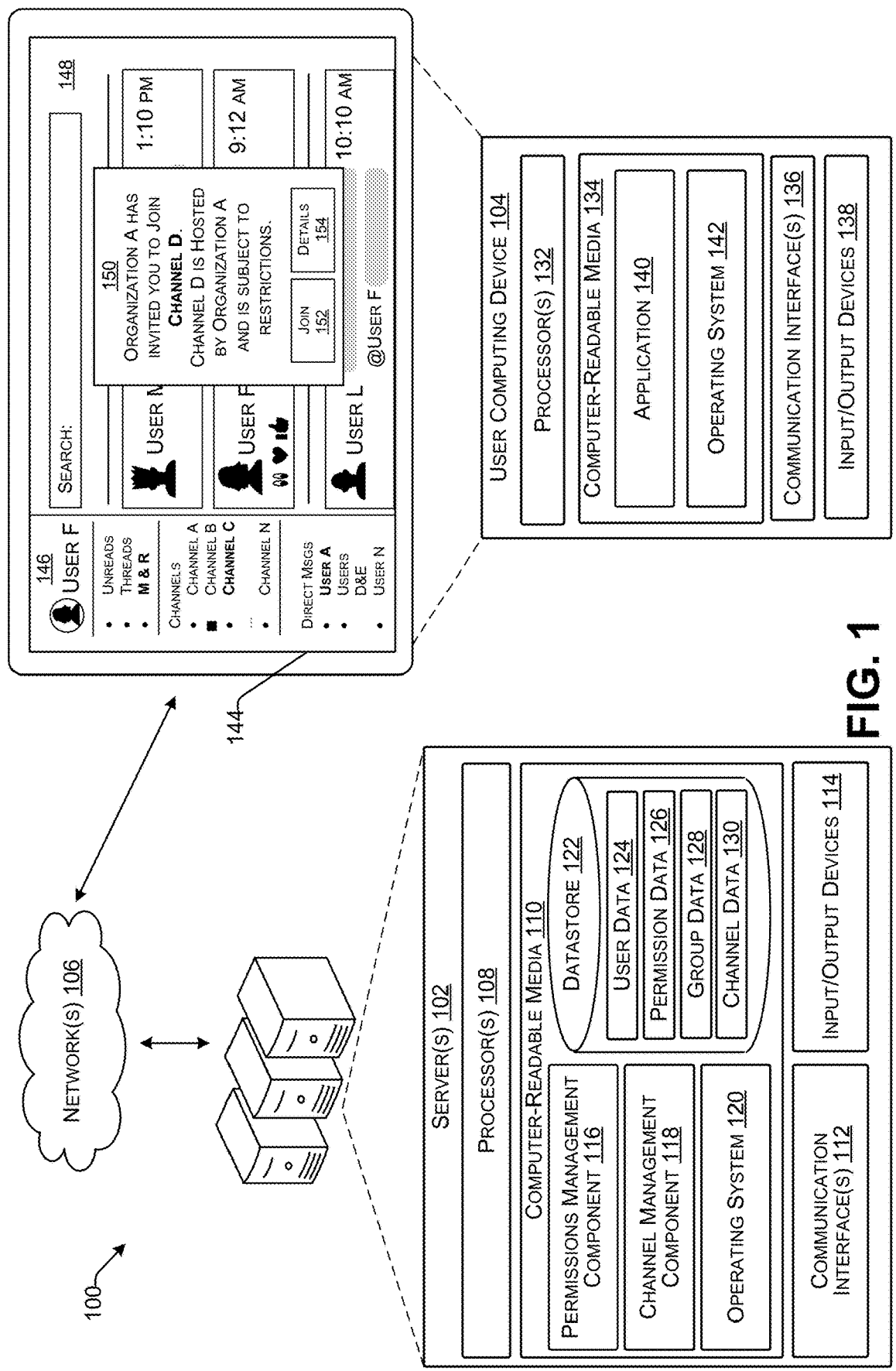
FIG. 1 illustrates an example environment for performing techniques described herein.

Hosted communication channels associated with a communication platform are described. In an example, a user can utilize communication services available via a communication platform, which, in some examples can be a group-based communication platform, a channel-based messaging platform and/or any other platform for facilitating communication between and among users. In some examples, a first organization can invite a second organization to join a communication channel. In such an example, the first organization can be a "host organization" and the second organization can be an "invited organization." The two organizations can be different such that they are associated with different organization identifiers and are associated with different permissions. In some examples, content associated with each organization can be private, such that other organizations cannot access content that is owned or otherwise managed by each organization. However, content posted to shared communication channels can be accessed, viewed, interacted with, or the like by any member of the shared communication channels (which can mean that users from different organizations can access, view, and/or interact with such content). To address privacy and/or security concerns, some organizations or users of the communication platform may desire to control how end users that join a shared communication channel interact with the shared communication channel.

In existing technologies, when a first organization shares a communication channel with another organization, any user associated with either organization can join the shared communication channel (e.g., so long as the shared communication channel is public for each organization), any user associated with either organization can add other users and/or organizations to the shared communication channel, any user associated with either organization can add content to the shared communication channel, any user associated with either organization can post messages to the shared communication channel, and the like. This can cause both privacy and/or security concerns. For example, a host organization associated with a shared communication channel may not want every user associated with another organization, that is invited to join the shared communication channel, to be able to join the shared communication channel. As another example, a host organization associated with a shared communication channel may only want particular users—such as verified users—to be able to join and/or use the shared communication channel. In yet another example, a host organization associated with a shared communication channel may not want another organization invited to join the shared communication channel to be able to see a title assigned to the shared communication channel by the host organization (e.g., it may be confidential, or an internal code name used for a project). In another example, a host organization associated with a shared communication channel may want to set a privacy setting (e.g., public, private, etc.) and may not want the other organization associated with the shared communication channel to be able to modify the privacy setting.

Techniques described herein are directed to enabling a host organization to establish permissions for a communication channel that is shared with another organization. That is, in at least one example, an entity associated with a host organization (e.g., an administrator or other user) can set permissions associated with a communication channel that is to be shared with another organization (i.e., the "invited organization"). The invited organization can join the communication channel (thereby establishing a shared communication channel) and can use the communication channel within the scope of the permissions set by the host organization. In at least one example, such permissions can indicate whether information associated with the shared communication channel, as designated by the host organization (e.g., name, details, description, etc.), is viewable by the invited organization, whether the invited organization can modify privacy settings associated with the shared communication channel (e.g., private, public, etc.), whether the invited organization can add one or more users and/or other organizations to the shared communication channel, one or more users who are permitted to add other users and/or other organizations to the shared communication channel, one or more roles of users who are permitted to add other users and/or other organizations to the shared communication channel, whether the invited organization can add files or other content to the shared communication channel, a retention policy associated with content associated with the shared communication channel, types of users (e.g., administrators, verified users, groups of users, etc.) that can access the shared communication channel, and/or the like. In at least one example, such permission(s) can be associated with an organization (e.g., the invited organization), a workspace associated with the organization, specified users, the shared communication channel, or the like. In at least one example, the communication platform can enforce the permissions, thereby enabling more privacy and more security than is available with conventional shared communication channels.

Take as an example, an administrator or other user associated with a host organization can set a policy, comprising one or more permissions, for externally shared communication channels (e.g., communication channels shared with another organization) to follow a prescribed level of external privacy, thereby limiting the ability of the invited organization(s) to see information associated with the shared communication channels (e.g., name(s), description(s), detail(s), etc.), modify privacy settings (e.g., make the shared communication channels public (or private)), add users and/or organizations to the shared communication channel (e.g., without the host organization's permission), or the like. In some examples, the administrator can define a policy for all externally shared communication channels associated with the host organization, for all externally shared communication channels associated with a workspace of the host organization, for a particular externally shared communication channel, for individuals associated with externally shared communication channels, and the like.

In some examples, an administrator of a host organization can receive requests to override permissions associated with externally shared communication channels. In some examples, the administrator can approve such override requests. In some examples, an administrator can receive requests to add additional external users (e.g., users associated with the invited organizations) that have been invited but not allowed to join to externally shared communication channels (e.g., that are shared between two or more organizations) and the administrator can determine whether to permit such additional users to be added to the externally shared communication channels. In some examples, such an administrator can remove external users from externally shared communication channels. In some examples, another user of the host organization can perform the same operations. That is, such permissions are not only available to administrators.

In at least one example, an end user associated with an invited organization may be permitted to access the externally shared communication channel (e.g., based on the policy and/or permission(s)), but may be restricted with respect to operations that they can perform. For instance, an external user (e.g., a user associated with the invited organization) may not be able to unilaterally add other external users to the externally shared communication channel (e.g., if the permissions specify that users of the invited organization are not permitted to unilaterally add other external users). In such an example, the end user may be allowed to add other external users (if at all) by communicating with the host organization. In such an example, a user and/or administrator associated with the host organization can approve the addition of external members that have been proposed or requested to be added but who are not allowed to join on their own. In some examples, such a user and/or administrator can additionally or alternatively remove external members from the shared communication channel.

In addition to managing permissions associated with hosted communication channels, techniques described herein are directed to verifying entities (e.g., organizations, users, etc.) associated with the communication platform, to provide increased trust and security in the communication platform and/or communications associated with the communication platform. That is, to further offer improvements to the use and/or adoption of external products available via the communication platform, techniques described herein relate to a verification process to determine that entities are who they say they are and/or are legitimate. In some examples, verified entities can be associated with an indicator that can be associated with such verified entities to provide a visual signal that such entities are verified by the communication platform. In some examples, verified entities can have an increased level of access to communication channels and/or the communication platform based on a set of permissions associated therewith. In at least one example, verified entities can perform operations conventionally reserved for administrators. Additional details are described below.

From the user experience perspective, techniques described herein greatly enhance organizational productivity and efficiency. They also reduce the need for other forms of communications (such as electronic mail), and provide better collaboration between different organizations while eliminating channel disconnections between groups of users. In addition, techniques described herein are configured to provide asymmetrical and customizable privacy settings, where an externally shared communication channel between two organizations may have one privacy configuration for one organization and a different configuration for the other organization. In some examples, both privacy configurations can be designated by one organization (e.g., the host organization or the invited organization). Further, externally shared communication channels may create cross-network effects, which increases user retention rates from different organizations or different workspaces.

From a developer's perspective, techniques described herein provide support for the retrieval and appropriate visibility of data, while providing the flexibility of retention settings. Techniques described herein also enable the selective connection of communication channels, as well as groups of users based on communication channels.

As described above, techniques described herein provide improved privacy and security for communication channels that are part of a communication platform. This enables hosting organizations to better manage which external users can join externally shared communication channels, to better manage what information external users can access and/or interact with, and to better manage privacy settings associated with externally shared communication channels. That is, techniques described herein enable enhanced privacy and security and therefore offer improvements to existing shared communication channel technology.

As such, techniques described herein provide specific, technical solutions to technical problems faced by existing systems, the details of which are described hereinafter.

While the description above describes setting permissions for externally shared communication channels, techniques described herein can similarly be applicable to communication channels that are within a same organization. For example, in some examples, techniques described herein can be used to apply permissions associated with a prescribed level of privacy to communication channels shared between different workspaces within an organization. Additionally or alternatively, in some examples, techniques described herein can be used to apply permissions associated with a prescribed level of privacy to internal communication channels. That is, a user and/or administrator can set a policy thereby limiting the ability of other users to see information associated with the communication channels (e.g., name(s), description(s), detail(s), etc.), make the communication channels public (or private), add users and/or organizations to the communication channel (e.g., without the user's permission), or the like. As such, techniques described herein are not limited to externally shared communication channels (e.g., between two organizations).

As described above, in addition to managing permissions associated with hosted communication channels, techniques described herein are directed to verifying entities associated with the communication platform, to provide increased trust and security in the communication platform and/or communications associated with the communication platform. In some examples, by providing processes through which entities (e.g., organizations, groups, users, etc.) can be verified by the communication platform, interactions between entities can be streamlined. For example, by verifying organizations, a shared channel between the two organizations can be established without requiring approval from an administrator of the invited organization. As another example, by verifying users, verified users can perform certain operations (e.g., as designated by a set of permissions) that non-verified users cannot perform. In some examples, such operations can be operations that conventionally require administrator approval to perform. That is, by utilizing verification processes as described herein, end users can perform operations without involving additional users (e.g., administrators), which can reduce the number of interactions associated with the performance of such operations and can thereby increase the speed and efficiency with which such operations are performed. Such verification processes can thereby remove latency associated with existing systems. Further, such verification processes can increase security, and thus confidence, in communication platforms as described herein. Thus, techniques described herein can provide technical solutions to technical problems that provide improvements to technical processes.

Additional details and examples are described below with reference to FIGS. 1-11.

FIG. 1 illustrates an example environment 100 for performing techniques described herein. The example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to defined groups of users. In some examples, such groups of users can be defined by identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other.

In some examples, each group can be associated with an organization, which can be associated with an organization identifier. Users associated with the organization identifier can chat, meet, call, collaborate, transfer files or other data, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, or otherwise communicate between or among each other in a secure and private virtual space available via the communication platform. In some examples, a group can be associated with multiple organizations and/or workspaces. In some examples, an organization can be associated with multiple workspaces.

In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a permissions management component 116, a channel management component 118, an operating system 120, and a datastore 122.

In at least one example, the permissions management component 116 can manage permissions associated with groups (e.g., organization(s), workspace(s), etc.), user(s), communication channel(s), and the like. In some examples, an administrator or other user associated with a group can set permission(s) for the group (e.g., an organization or workspace). In some examples, permission(s) for the group can be set automatically (e.g., by the permissions management component 116). In some examples, permission(s) can be set for individual communication channels, communication channels of certain types (e.g., internal, external, public, private, shared, etc.), individual users, types of users (e.g., verified users, users having designated roles, etc.), or the like. In some examples, an administrator or a user of a group can set permissions that indicate whether information associated with a communication channel (e.g., name, details, description, etc.) is viewable by other users and/or groups, whether other users and/or groups can modify privacy settings associated with the communication channel (e.g., private, public, etc.), whether other users and/or groups can add one or more other users and/or organizations to the communication channel, one or more users who are permitted to add one or more other users and/or organizations to the communication channel, one or more roles of users who are permitted to add one or more other users and/or other organizations to the communication channel, whether the other users and/or groups can add files or other content to the communication channel, a retention policy associated with content associated with the communication channel, types of users (e.g., administrators, verified users, groups of users, etc.) that can access the communication channel, and/or the like. In at least one example, such permission(s) can be associated with an organization (e.g., the invited organization), a workspace associated with the organization, specified users, individual communication channels, or the like. In some examples, an administrator or other user of a group can set permission(s) that can be enforced on other groups and/or users, for example for use with shared communication channels. In at least one example, the permissions management component 116 can communicate with the channel management component 118 to enforce the permissions, as described herein.

In at least one example, the permissions management component 116 can verify entities (e.g., organizations, groups, users, etc.) and/or facilitate the verification of entities, thereby establishing permissions associated with different types of entities (e.g., verified and unverified). In some examples, the permissions management component 116 can access data associated with an entity, determine whether to verify the entity, and based at least in part on a determination that the entity is verified, the permissions management component 116 can associate a set of permissions with the entity. In some examples, the set of permissions can identify operations that the entity is permitted to perform. In some examples, verified entities can have greater access to individual communication channels and/or the communication platform based on the set of permissions associated therewith. In some examples, the set of permissions can indicate whether information associated with a communication channel and/or communication platform can be viewed by the entity, whether privacy settings associated with a communication channel can be modified by the entity, whether the entity can add other users and/or other organizations to the communication channel and/or communication platform, whether the entity can add files and/or other content to the communication channel and/or communication platform by the user, etc. In some examples, verified entities can be associated with an indicator such that operations performed by verified entities can be represented in a user interface with the indicator showing that the entities performing such operations are verified (or not). Additional details are described below.

In at least one example, the channel management component 118 can manage communication channels (i.e., "channels"). As described above, in at least one example, the communication platform can be a channel-based messaging platform, that in some examples, can be usable by group(s) of users. As described above, each group can be associated with a group identifier (e.g., organization identifier, workspace identifier) and one or more user accounts can be mapped to, or otherwise associated with, the group identifier. User(s) corresponding to such user account(s) can be "members" of the group. Users of the communication platform can communicate with other users via communication channels. A communication channel, or virtual space, can be a data route used for exchanging data between and among systems and devices associated with the communication platform. In at least one example, the channel management component 118 can establish a communication channel between and among various user computing devices, allowing the user computing devices to communicate and share data between and among each other. In at least one example, the channel management component 118 can manage such communications and/or sharing of data. In some examples, data associated with a communication channel can be presented via a user interface. In at least one example, the channel management component 118 can interact with the permissions management component 116 to manage the generation, presentation, and/or updating of user interfaces. Additional details of operations that can be performed by the channel management component 118 are described below.

In some examples, a communication channel may be "public," which may allow any user within a group (e.g., associated with an organization identifier, associated with a workspace identifier, etc.) to join and participate in the data sharing through the communication channel, or a communication channel may be "private," which may restrict data communications in the communication channel to certain users or users having particular roles (e.g., managers, administrators, etc.) and/or types (e.g., verified, etc.). In some examples, a communication channel may be "shared," which may allow users associated with two or more different groups (e.g., entities associated with two or more different organization and/or workspace identifiers) to join and participate in the data sharing through the communication channel. Shared channels may be public such that they are accessible to any user of either group, or they may be private such that they are restricted to access by certain users or users having particular roles and/or types.

In at least one example, the channel management component 118 can receive a request to generate a communication channel. In some examples, the request can include a name that is to be associated with the communication channel, one or more users to invite to join the communication channel, and/or permissions associated with the communication channel. In some examples, the user(s) can be associated with a same group as the requesting group or a different group. For example, in some examples, one or more of the user(s) can be associated with a different group such that the communication channel can be "externally" shared. As described above, in at least one example, a first organization (or the host organization) can invite a second organization (or the invited organization) to join a communication channel. A resulting channel can be called a "shared communication channel" or an "externally shared communication channel." In some examples, an administrator or other user associated with the first organization can invite new members in the first organization or the second organization via a mention, a profile view, an email, or generating a link from a user interface associated with the communication channel that enables users to be added to the communication channel. Additional details associated with creating and managing shared communication channels are described with reference to U.S. Pat. No. 10,541,825, which issued on Jan. 21, 2020, and U.S. Pat. No. 10,402,371, which issued on Sep. 3, 2019, the entire contents of both of which are incorporated by reference herein. Further, additional details associated with inviting other groups to join shared communication channels are described with reference to U.S. patent application Ser. No. 16/681,479, which was filed on Nov. 12, 2019 and U.S. patent application Ser. No. 16/681,452, which was filed on Nov. 12, 2019, the entire contents of both of which are incorporated by reference herein.

In at least one example, users can be added or removed from a shared communication channel. Users who are associated with a shared communication channel can access and/or otherwise interact with data associated with the shared communication channel. Users who are not associated with a shared communication channel, may not access and/or otherwise interact with data associated with the shared communication channel. In some examples, a user can preview data associated with a shared communication channel, but may not be able to interact with such data if the user is not associated with the shared communication channel. Additional details associated with joining and leaving, or otherwise managing connections within, communication channels are described with reference to U.S. Provisional Patent Application No. 62/977,690, filed on Feb. 17, 2020, the entire contents of which are incorporated by reference herein. Furthermore, additional details associated with governing data and/or otherwise managing data associated with shared communication channels are described in U.S. patent application Ser. No. 16/778,993, filed on Jan. 31, 2020, the entire contents of which are incorporated by reference herein.

As described above, users of different workspaces or other groups can create shared communication channels using same or similar techniques.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one multiple databases, which can include user data 124, permission data 126, group data 128, and channel data 130. Additional or alternative data may be stored in the data store and/or one or more other data stores.

In at least one example, the user data 124 can store data associated with users of the communication platform. In at least one example, the user data 124 can store data inuser profiles (which can also be referred to as "user accounts"), which can store data associated with a user, including, but not limited to, one or more user identifiers associated with multiple, different organizations, groups, or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In some examples, the user data 124 can be associated with an indication of whether a user is verified. In some examples, the communication platform can verify individual users to ensure that the users are who they say they are and/or to ensure that such individual users are legitimate. In some examples, such verification can be done via Domain Name System (DNS) and/or Secure Socket Layer (SSL) certification verification, two-factor or multi-factor verification using email, text message, biometrics, or the like, manual review (e.g., checking for managed accounts, non-malicious activity, legitimate activity, etc.), or the like. In some examples, third-party data can be used to verify a user (e.g., address, website, social media, etc.). In some examples, if a user has been verified, a symbol, icon, or other indicator can be presented in association with information about the user on user interfaces as described herein to visually indicate that the user has been verified.

In some examples, verified users can be associated with a first set of permissions, which can be different than a second set of permissions associated with unverified users. In some examples, a set of permissions associated with a verified user can indicate whether information associated with a communication channel and/or communication platform can be viewed by a user, whether privacy settings associated with a communication channel can be modified by the user, whether the user can add other users and/or other organizations to the communication channel and/or communication platform, whether the user can add files and/or other content to the communication channel and/or communication platform by the user, etc. In some examples, verified users can be associated with a first level of access (e.g., which can be defined by permissions) that is greater than a second level of access (e.g., which can be defined by permissions) provided to unverified users. For example, verified users can add other users and/or organizations to a communication channel and/or shared communication channel without administrative approval, whereas unverified users may need to go through an administrator to do so. As another example, verified users can set up shared communication channels without administrative approval, wherein unverified users may need to go through an administrator to do so.

In some examples, when a user is performing a search for another user, verified users can auto-populate whereas unverified users may not. That is, when an identifier of a user, or a portion thereof, is provided as a search query, the channel management component 118 can perform a search of users associated with the communication platform, and if the identifier or portion thereof corresponds to a verified user, the channel management component 118 can auto-populate the remaining portion of the identifier. Such a feature may not be available for unverified users. Furthermore, in some examples, verified users can be associated with a directory from which other users can identify which users are verified (or not).

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group in the group data 128. In some examples, permissions can indicate restrictions on individual groups, restrictions on communication channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual communication channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a communication channel can be mapped to, or otherwise associated with, data associated with the communication channel in the channel data 130. In some examples, permissions can indicate restrictions on individual communication channels, restrictions on user(s) associated with individual communication channels, and the like.

In at least one example, the group data 128 can store data associated with individual groups, which as described above, can be organizations, workspaces, or the like. As described above, the communication platform can be partitioned into groups associated with groups of users. In at least one example, a group identifier can be associated with a group that is registered, or otherwise associated with, the communication platform. In at least one example, the group identifier can indicate a physical address in the group data 128 where data related to the corresponding group is stored. In at least one example, data associated with group permissions can be stored in association with the group identifier, data identifying users associated with the group can be stored in association with the group identifier, data associated with messages and/or other content associated with the group can be stored in association with the group identifier, data associated with communication channels associated with the group can be stored in association with the group identifier, and the like. In some examples, such data can be mapped to, or otherwise associated with, other types of data in the datastore 122 (e.g., the user data 124, the permission data 126, the channel data 130, etc.).

In some examples, the group data 128 can be associated with an indication of whether a group is verified. In some examples, the communication platform can verify individual groups, such as organizations, to ensure that the organizations are who they say they are and/or to ensure that such individual organizations are legitimate. In some examples, such verification can be done via Domain Name System (DNS) and/or Secure Socket Layer (SSL) certification verification, two-factor or multi-factor verification using email, text message, biometrics, or the like, manual review (e.g., checking for managed accounts, non-malicious activity, legitimate activity, etc.), or the like. In some examples, third-party data can be used to verify an organization (e.g., business address, website, social media, etc.). In some examples, if an organization has been verified, a symbol, icon, or other indicator can be presented in association with information about the group on user interfaces as described herein to visually indicate that the organization has been verified.

In some examples, verified organizations can be associated with a first set of permissions, which can be different than a second set of permissions associated with unverified organizations. In some examples, a set of permissions associated with a verified organization can indicate whether information associated with a communication channel and/or communication platform can be viewed by an organization, whether privacy settings associated with a communication channel can be modified by the organization, whether the organization can add other users and/or other organizations to the communication channel and/or communication platform, whether the organization can add files and/or other content to the communication channel and/or communication platform by the organization, etc. In some examples, verified organizations can be associated with a first level of access (e.g., which can be defined by permissions) that is greater than a second level of access (e.g., which can be defined by permissions) provided to unverified organizations.

In some examples, when an organization is performing a search for another organization, verified organizations can auto-populate whereas unverified organizations may not. That is, when an identifier of an organization, or a portion thereof, is provided as a search query, the channel management component 118 can perform a search of organizations associated with the communication platform, and if the identifier or portion thereof corresponds to a verified organization, the channel management component 118 can auto-populate the remaining portion of the identifier. Such a feature may not be available for unverified organizations. Furthermore, in some examples, verified organizations can be associated with a directory from which other organizations can identify which organizations are verified (or not).

Additional or alternative groups can be verified using similar techniques as described herein.

In at least one example, the channel data 130 can store data associated with individual communication channels. In at least one example, the channel management component 118 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), communication channels, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored. In some examples, a database shard can store data related to two or more groups (e.g., as in a shared channel).

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HypterText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input.

A non-limiting example of a user interface 144 is shown in FIG. 1. As illustrated in FIG. 1, the user interface 144 can present data associated with one or more communication channels and, in some examples, one or more groups. In some examples, the user interface 144 can include a first region 146, or pane, that includes indicator(s) (e.g., user interface element(s) or object(s)) representing data associated with the group(s), communication channel(s), etc. with which the user (e.g., account of the user) is associated. Additional details associated with the first region 146 and indicator(s) are described below with reference to FIG. 2.

In at least one example, the user interface 144 can include a second region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the second region 148 can be associated with the same or different workspaces. That is, in some examples, the second region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the second region 148 presents data associated with multiple workspaces, at least some data can be associated with an indication of which workspace the data is associated with. Additional details associated with the user interface 144, and the second region 148, are described below with reference to FIG. 2.

In at least one example, when a first organization invites a second organization with which the user of the user computing device 104 is associated (e.g., with which User F is associated) to join a shared communication channel, a notification 150 can be presented via the user interface 144. In some examples, the notification 150 can be a pop-up, overlay, or, in some examples, another user interface. The notification 150 can indicate that another organization has invited the user (e.g., User F) to join a shared communication channel. In some examples, the notification 150 can indicate that the communication channel is subject to restrictions (e.g., is associated with one or more permissions, as described herein). In at least one example, the notification 150 can include controls, such as a first control 152 and a second control 154. In at least one example, the user can interact with the controls to provide an input via the user interface 144. In at least one example, based at least in part on actuating the first control 152, the user can join the communication channel (e.g., Channel D). That is, the channel management component 118 can receive an indication that the user actuated the first control 152 and can associate the user with the communication channel. In such an example, the communication platform can imply that the user accepts the permission(s) associated with the communication channel. In some examples, based at least in part on actuating the second control 154, additional information (e.g., details) associated with the communication channel can be presented via the user interface 144. In some examples, such information can include the restrictions associated with the communication channel, other users associated with the communication channel, a name of the communication channel, a description of the communication channel, and/or the like. Such information can be presented via a pop-up, overlay, or, in some examples, another user interface. In some examples, the notification 150 can include additional or alternative mechanisms or controls that enable the user to explicitly reject the permission(s) associated with the communication channel and/or the like.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the permissions management component 116, the channel management component 118, and the application 140, techniques described herein can be performed by any other component, or combination of components, which can be associated with the server(s) 102, the user computing device 104, or a combination thereof.

Figure 2:
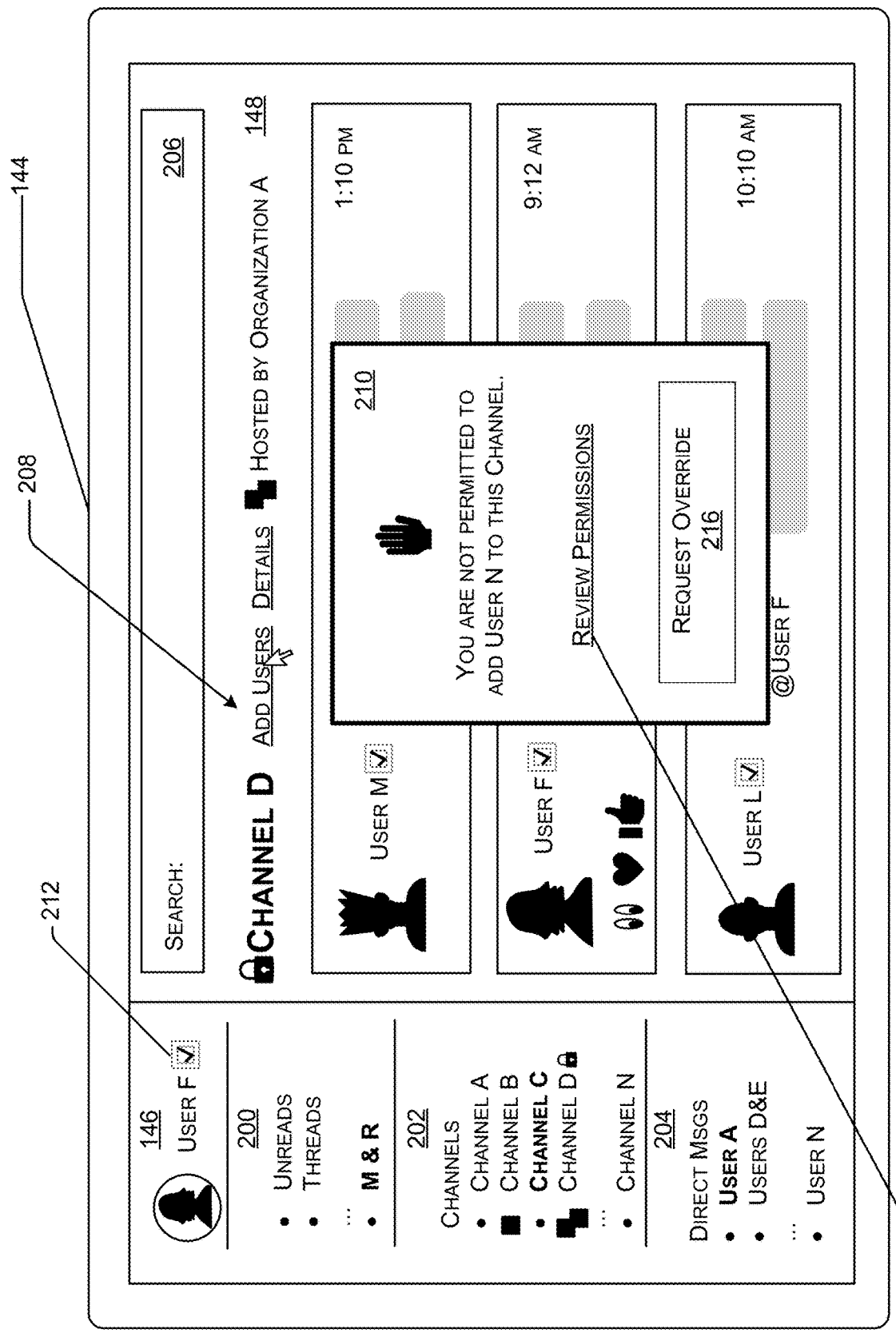
FIG. 2 illustrates an example user interface associated with a notification regarding permission(s) associated with a communication channel, as described herein.

FIG. 2 illustrates additional details associated with the user interface 144, wherein the user interface 144 is presenting a notification regarding permission(s) associated with a communication channel, as described herein.

In some examples, the user interface 144 can include a first region 146, or pane, that includes indicator(s) (e.g., user interface element(s) or object(s)) representing virtual space(s) associated with the workspace(s) with which the user (e.g., account of the user) is associated. In at least one example, the first region 146 can include one or more sub-sections, or sub-panes, which can represent different virtual spaces. For example, a first sub-section 200 can include indicators representing virtual spaces that can aggregate data associated with a plurality of communication channels and/or workspaces. In at least one example, each virtual space can be associated with an indicator in the first sub-section 200. In some examples, an indicator can be associated with an actuation mechanism such that when actuated, can cause the application 140 to present data associated with the corresponding virtual space via the second region 148. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second region 148, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action. If at least one of the user or a group with which the user is associated are verified, the indication can be associated with an indicator indicating that the user and/or group is/are verified. Additional details are described below.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the first region 146 of the user interface 144 can include a second sub-section 202, or sub-pane, that includes indicators representing communication channels. In some examples, the communication channels can include public channels, private channels, shared channels (e.g., between workspaces or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 202 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 202 can depict all communication channels, or a subset of all communication channels, that the user is a member of, and the user can interact with the user interface 144 to browse or view other communication channels that the user is not a member of but are not currently displayed in the second sub-section 202. In some examples, different types of communication channels (e.g., public, private, shared, etc.) can be in different sections of the second sub-section 202, or can have their own sub-regions or sub-panes in the user interface 144. In some examples, communication channels associated with different workspaces can be in different sections of the second sub-section 202, or can have their own regions or panes in the user interface 144.

In some examples, the indicators can be associated with visual elements that visually differentiate types of communication channels. For example, Channel D is associated with a double square visual element instead of a circle visual element. As a non-limiting example, and for the purpose of this discussion, the double square visual element can indicate that the associated communication channel (e.g., Channel D) is an externally shared communication channel. In some examples, such a visual element can be the same for all externally shared communication channels. In other examples, such a visual element can be specific to the other group with which the externally shared communication channel is associated. In yet another example, a visual element can be associated with a communication channel to indicate that the communication channel is associated with limited permissions. For example, the single square associated with Channel B can indicate that Channel B is associated with limited permissions. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 202 of the user interface 144. In such examples, the user may navigate to a different interface (not shown) to browse additional channels that are accessible to the user but to which the user is not currently a member.

In addition to the second sub-section 202, the first region 146 can include a third sub-section 204, or sub-pane, that can include indicators representative of communications with individual users or multiple specified users (e.g., instead of all, or a subset of, members of an organization). Such communications can be referred to as "direct messages." That is, the third sub-section 204, or sub-pane, can include indicators representative of virtual spaces that are associated with private messages between one or more users.

As described above, in at least one example, the user interface 144 can include a second region 148, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the second region 148 can be associated with the same or different workspaces. That is, in some examples, the second region 148 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the second region 148 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the second region 148 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, messaging communications associated with a communication channel can appear differently for different users (e.g., based on personal configurations, group membership, permissions, policies, etc.).

In at least one example, the format of the individual communication channels or virtual spaces may appear differently to different users. In some examples, the format of the individual communication channels or virtual spaces may appear differently based on which workspace or organization a user is currently interacting with or most recently interacted with. In some examples, the format of the individual communication channels or virtual spaces may appear differently for different users (e.g., based on personal configurations, group membership, permission(s), etc.).

In at least one example, the user interface 144 can include a search mechanism 206, wherein a user can input a search term and the server(s) 102 can perform a search associated with the communication platform. In some examples, the search can be performed across each group with which the user is associated, or the search can be restricted to a particular group, based on a user specification.

In FIG. 2, the user can interact with the visual element that corresponds to Channel D in the second sub-section 202 and as such, a feed associated with the communication channel can be presented via the second region 148 of the user interface. In some examples, visual elements 208 representing information associated with Channel D can be presented in association with the second region 148 and/or operations that can be performed in association with Channel D. In some examples, one of the visual elements 208 can indicate that the communication channel is hosted by another organization (e.g., Organization A).

In at least one example, the user can interact with a visual element to request to add a user to the communication channel. In some examples, the user—who can be an administrator or other user associated with the—can invite other users (e.g., new members) via a mention, a profile view, an email, or generating a link from a user interface associated with the communication channel that enables users to be added to the communication channel. In at least one example, a notification 210 can be presented via the user interface 144, which can indicate that the user is not permitted to add the user they requested to add to the communication channel. In at least one example, based at least in part on the user specifying another user to add to the communication channel, the application 140 can send an indication of the request, which can be associated with the user and the other user, to the server(s) 102. The permissions management component 116 can receive the request (e.g., via the channel management component 118), access the permission data 126, and determine whether (i) the user is permitted to add other users to the communication channel (e.g., per the permissions set by the host organization) and/or (ii) whether the other user is permitted to be added to the communication channel. In some examples, a user may not be permitted to add other users unless the permission data 126 so indicates. In some examples, the permission data 126 can indicate that a user can add other users if the user is verified (e.g., as indicated by the visual element 212), if the user is associated with a particular role (e.g., administrator, etc.), and/or the like. In some examples, another user may not be permitted to be added to the communication channel because (i) the permission data 126 explicitly forbids the other user to be added, (ii) the user is not verified (and the permission data 126 indicates only verified users can be added), (iii) the user is not associated with a permitted role, and/or the like.

In some examples, the notification 210 can include a mechanism 214 to enable the user to view permissions to understand why the user cannot add the other user to the communication channel. In FIG. 2 such a mechanism 214 can be a link that, when actuated, can cause the application 140 to present relevant permissions via the user interface 144.

In at least one example, the notification 210 can include a control 216 that, when actuated, can enable the user to submit a request to override the relevant permissions that are preventing the user from adding the other user to the communication channel. In such an example, the application 140 can send an override request to the server(s) 102. In some examples, the override request can indicate that the user rejects the permissions. The permissions management component 116 can send the override request to a user computing device associated with the other organization, workspace, or the like. If the other organization, workspace, or the like (e.g., a user and/or administrator associated therewith) approves the override request, the permissions management component 116 can receive an indication of such, update the permission data 126 to indicate that the permission has been overridden, and can send an indication that the override request was accepted to the user computing device 104.

As described above, in some examples, an administrator or a user of a group can set permissions that indicate whether information associated with a communication channel (e.g., name, details, description, etc.) is viewable by other users and/or groups, whether other users and/or groups can modify privacy settings associated with the communication channel (e.g., private, public, etc.), whether other users and/or groups can add one or more other users and/or organizations to the communication channel, one or more users who are permitted to add one or more other users and/or organizations to the communication channel, one or more roles of users who are permitted to add one or more other users and/or organizations to the communication channel, whether the other users and/or groups can add files or other content to the communication channel, a retention policy associated with content associated with the communication channel, types of users (e.g., administrators, verified users, groups of users, etc.) that can access the communication channel, and/or the like. In at least one example, such permission(s) can be associated with an organization (e.g., the invited organization), a workspace associated with the organization, specified users, individual communication channels, or the like. In at least one example, the permissions management component 116 can communicate with the channel management component 118 to enforce the permissions, as described herein.

In FIG. 2, the user interface 144 includes a visual element 212 that visually indicates that the user(s) depicted are verified users. As described above, in some examples, the user data 124 can be associated with an indication of whether a user is verified. In some examples, the communication platform can verify individual users to ensure that the users are who they say they are and/or to ensure that such individual users are legitimate. In some examples, such verification can be done via Domain Name System (DNS) and/or Secure Socket Layer (SSL) certification verification, two-factor or multi-factor verification using email, text message, biometrics, or the like, manual review (e.g., checking for managed accounts, non-malicious activity, legitimate activity, etc.), or the like. In some examples, third-party data can be used to verify a user (e.g., address, website, social media, etc.). In some examples, if a user has been verified, a symbol, icon, or other indicator can be presented in association with information about the user on user interfaces as described herein to visually indicate that the user has been verified. The visual element 212 is an example of such an indicator. In some examples, verified users are associated with certain permissions that unverified users are not. For example, verified users can add other users and/or organizations to a communication channel and/or shared communication channel without administrative approval, whereas unverified users may need to go through an administrator to do so. As another example, verified users can set up shared communication channels without administrative approval, wherein unverified users may need to go through an administrator to do so. In some examples, a same or similar indicator can be presented via the user interface 144 to indicate that an organization is verified. Such indicators can be useful to determine how to interact with other users and/or groups that are associated with the communication platform.

Figure 3:
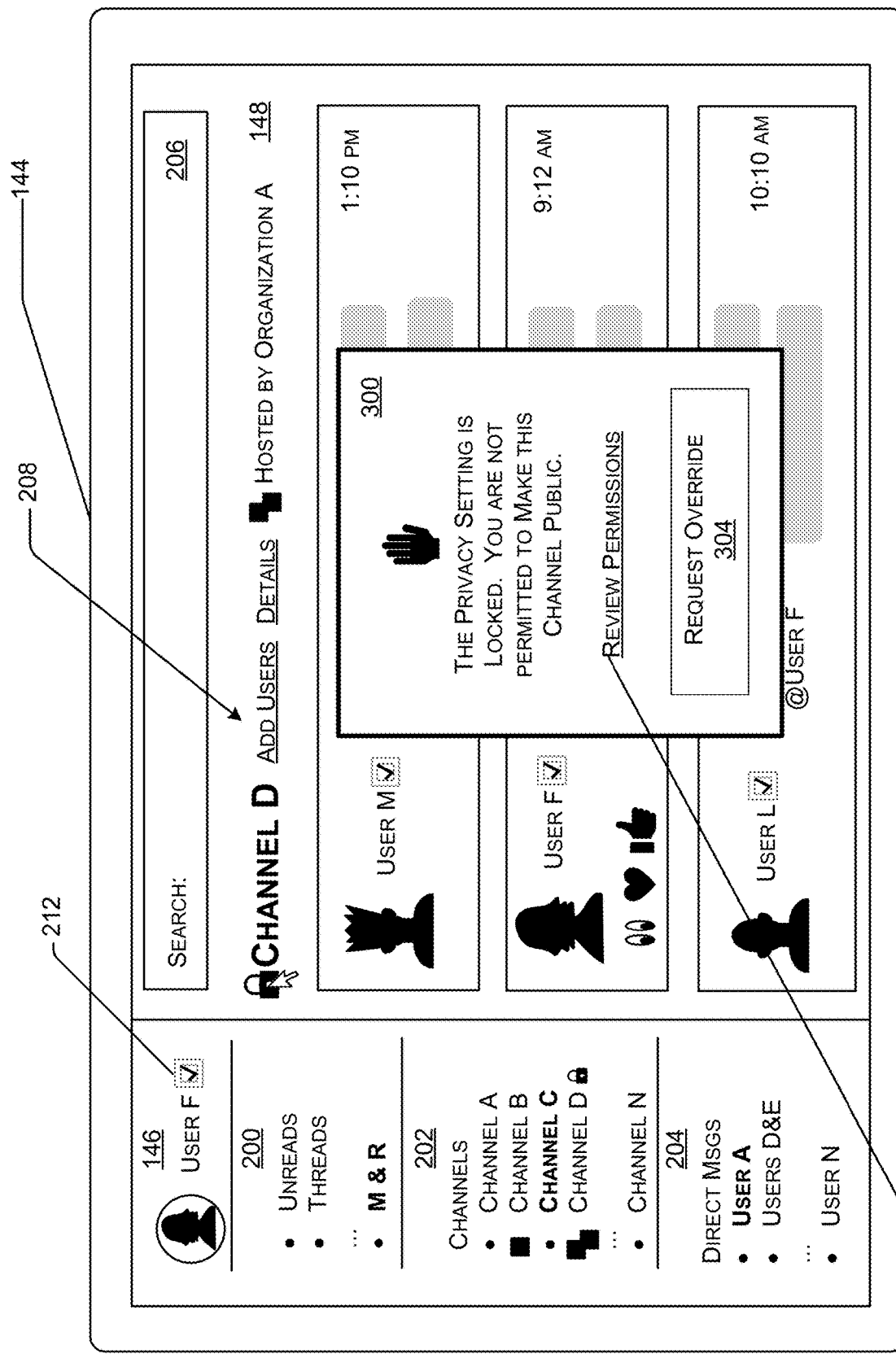
FIG. 3 illustrates an example user interface associated with a notification regarding permission(s) associated with a communication channel, as described herein.
Figure 4:
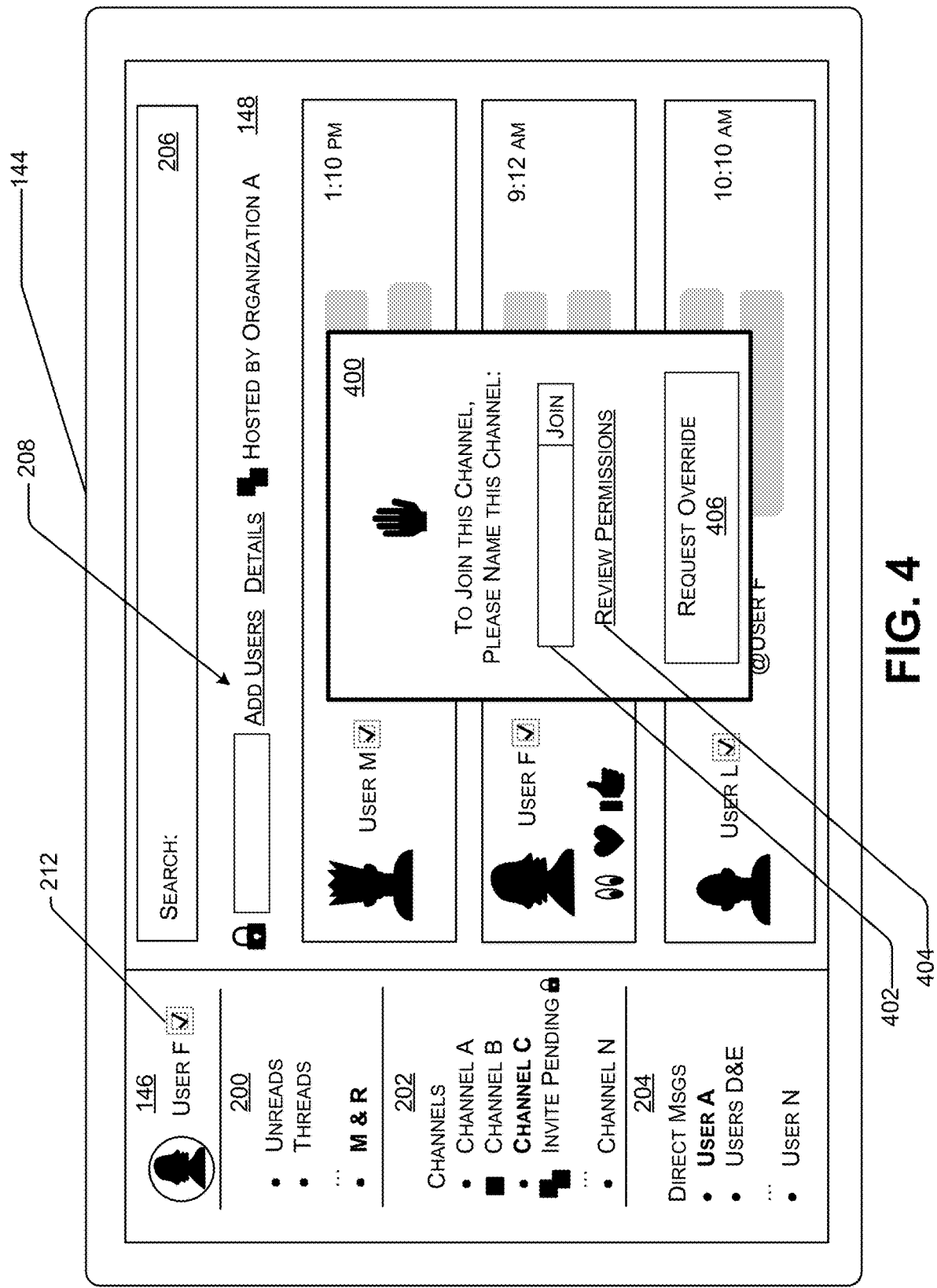
FIG. 4 illustrates an example user interface associated with a notification regarding permission(s) associated with a communication channel, as described herein.

FIGS. 3 and 4 illustrate examples of additional or alternative notifications that can be presented via the user interface 144, based at least in part on the user requesting to perform other operations. For example, in FIG. 3, the notification 300 can indicate that the user is not permitted to modify a privacy setting of the communication channel (e.g., from private to public). In some examples, the notification 300 can be a pop-up, overlay, or, in some examples, another user interface. In such an example, the host organization (e.g., Organization A) can have set the privacy setting associated with the communication channel as locked and can set a permission to prohibit the privacy setting from being modified. That is, based at least in part on the user requesting to modify a privacy setting associated with the communication channel, the application 140 can send an indication of the request, which can be associated with the user and the communication channel, to the server(s) 102. The permissions management component 116 can receive the request, access the permission data 126, and determine whether (i) the user is permitted to modify the privacy settings (e.g., per the permissions set by the host organization) and/or (ii) whether the privacy settings of the communication channel can be modified. As described above with reference to FIG. 2, in at least one example, the notification 300 can be associated with a mechanism 302 to enable the user to review the permissions, and a control 304 to request to override the permissions.

In FIG. 4, the notification 400 can indicate that the user is required to name the communication channel before joining the communication channel (e.g., because the invited organization or user is not permitted to view the name pursuant to the permission(s)). In some examples, the notification 400 can be a pop-up, overlay, or, in some examples, another user interface. In some examples, the permission data 126 can indicate that the user is not permitted to view the name of the communication channel (e.g., as named by the host organization). That is, responsive to the user indicating a desire to join the communication channel, the permissions management component 116 can determine whether the permission data 126 indicates that the user can view the name of the communication channel. If the user is not permitted to view the name of the communication channel, the application 140 can present the notification 400. In such an example, the notification 400 can include a free form text box 402 into which the user can input a name for the communication channel and can select a mechanism associated therewith to join the communication channel. Responsive to inputting a name for the communication channel and joining the communication channel, the communication channel can appear in the second sub-section, or sub-pane, 202 with the name as provided by the user. As described above with reference to FIG. 2, in at least one example, the notification 400 can be associated with a mechanism 404 to enable the user to review the permissions, and a control 406 to request to override the permission.

In some examples, if a user does not have permission to perform an operation (e.g., add another user and/or organization, add a file, modify a privacy setting, etc.), visual elements associated with such operations may not be presented in association with the user interface 144. For instance, if a user is not permitted to add another user, the option to "add users" may not be presented via the user interface. As another example, if a user is not permitted to view a name of a communication channel, or does not otherwise have permission to see the name of the communication channel, when the user searches for the communication channel, the communication channel may not show up for them to access.

Figure 5:
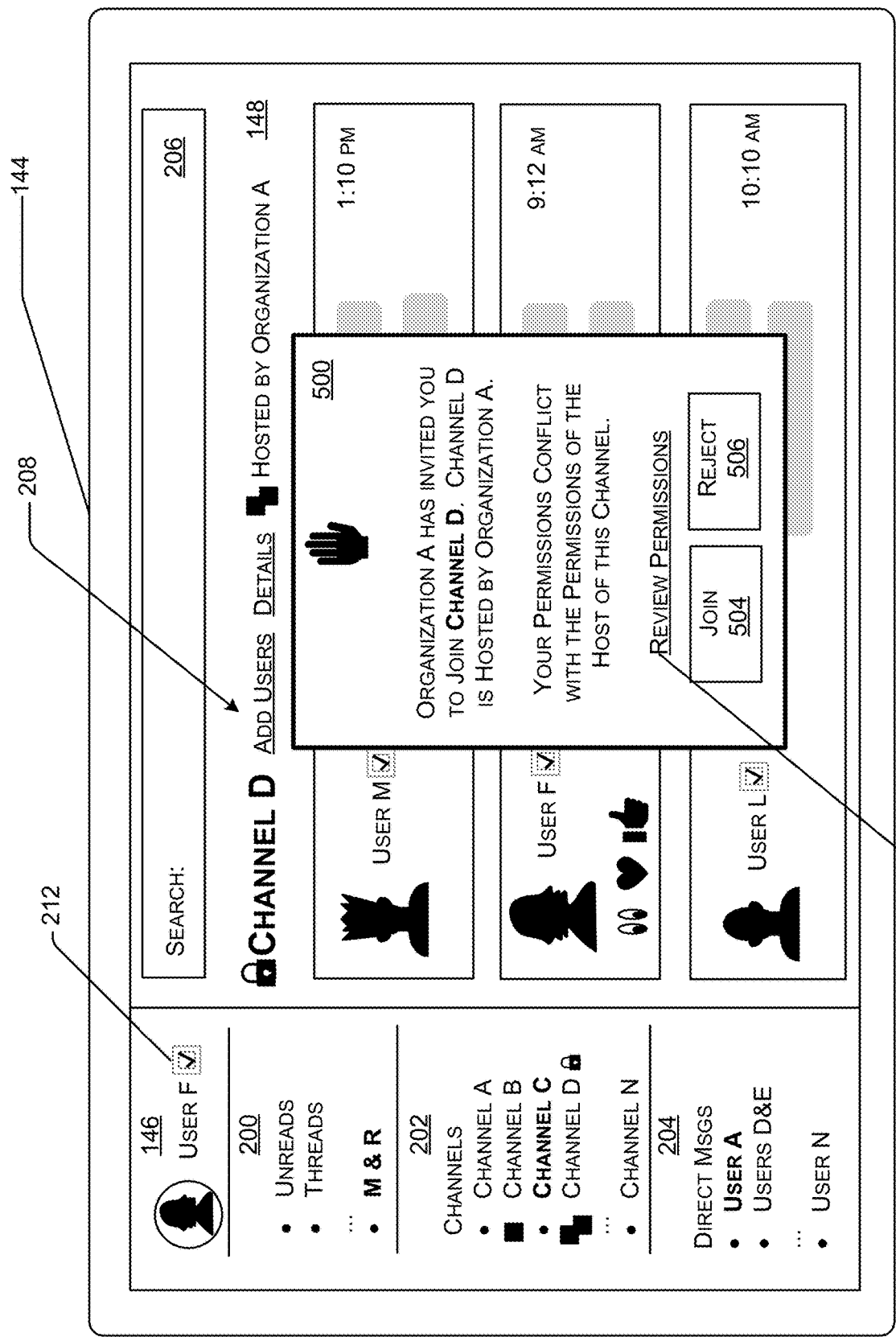
FIG. 5 illustrates an example user interface associated with a notification regarding permission(s) associated with a communication channel, as described herein.

FIG. 5 illustrates another example of a notification 500 presented via the user interface 144, wherein the notification 500 indicates that permissions associated with the communication channel (e.g., Channel D) are inconsistent with permissions of the invited organization. That is, in some examples, the host organization can set permissions that are in conflict with permissions of the invited organization. For example, the host organization can set a shorter (or longer) retention policy than what the invited organization has set for its retention policy, prohibit files from being added to a communication channel, or restrict an administrator from adding other users or organizations to the communication channel. In at least one example, a notification, such as the notification 500, can be presented via the user interface 144. In some examples, the notification 500 can be a pop-up, overlay, or, in some examples, another user interface. In some examples, responsive to receiving a request to associate another organization with a communication channel, the permissions management component 116 can access the permission data 126 to compare permission(s) associated with the communication channel—as designated by the host organization—with permission(s) associated with the other organization (e.g., the invited organization). If the permissions management component 116 detects an inconsistency, the permission management component 116 can send an indication of such to the application 140, which can cause the notification 500 to be presented via the user computing device 104. A same or similar notification can be presented—via a pop-up, overlay, other user interface, etc.—based at least in part on a user trying to post a message or perform another operation that is subject to a restriction.

In some examples, similar to what is described above with reference to FIG. 2, the notification 500 can be associated with a mechanism 502 to enable the user to review the permissions. In at least one example, the notification 500 can include a first control 504 that, when actuated, provides an input indicating that the user desires to join the communication channel. That is, based at least in part on detecting that the user actuates the first control 504, the application 140 can send an indication of such to the server(s) 102. The channel management component 118 can receive the indication and associate the invited organization with the communication channel. In some examples, the notification 500 can include a second control 506 that, when actuated, provides an input indicating that the user rejects the invitation to join the communication channel. In some examples, such an input, which can be sent to the server(s) 102 via the application 140, can be provided back to the host organization to notify the host organization that the invited organization declined the invitation to join the communication channel. In such an example, the host organization and the invited organization—or administrators, users, etc. associated therewith—can negotiate or determine additional or alternative permissions that are acceptable to both organizations.

The user interface 144 is a non-limiting example of a user interface that can be presented via the user computing device 104 (e.g., by the application 140). In some examples, the application 140 can receive data from the permissions management component 116 and/or channel management component 118 and the application 140 can generate and present the user interface 144 based on the data. In other examples, the application 140 can receive data and/or instructions for generating the user interface 144 from the permissions management component 116 and/or channel management component 118. In such an example, the application 140 can present the user interface 144 based on the instructions. Additional or alternative data can be presented via a user interface and additional or alternative configurations can be imagined.

Figure 6:
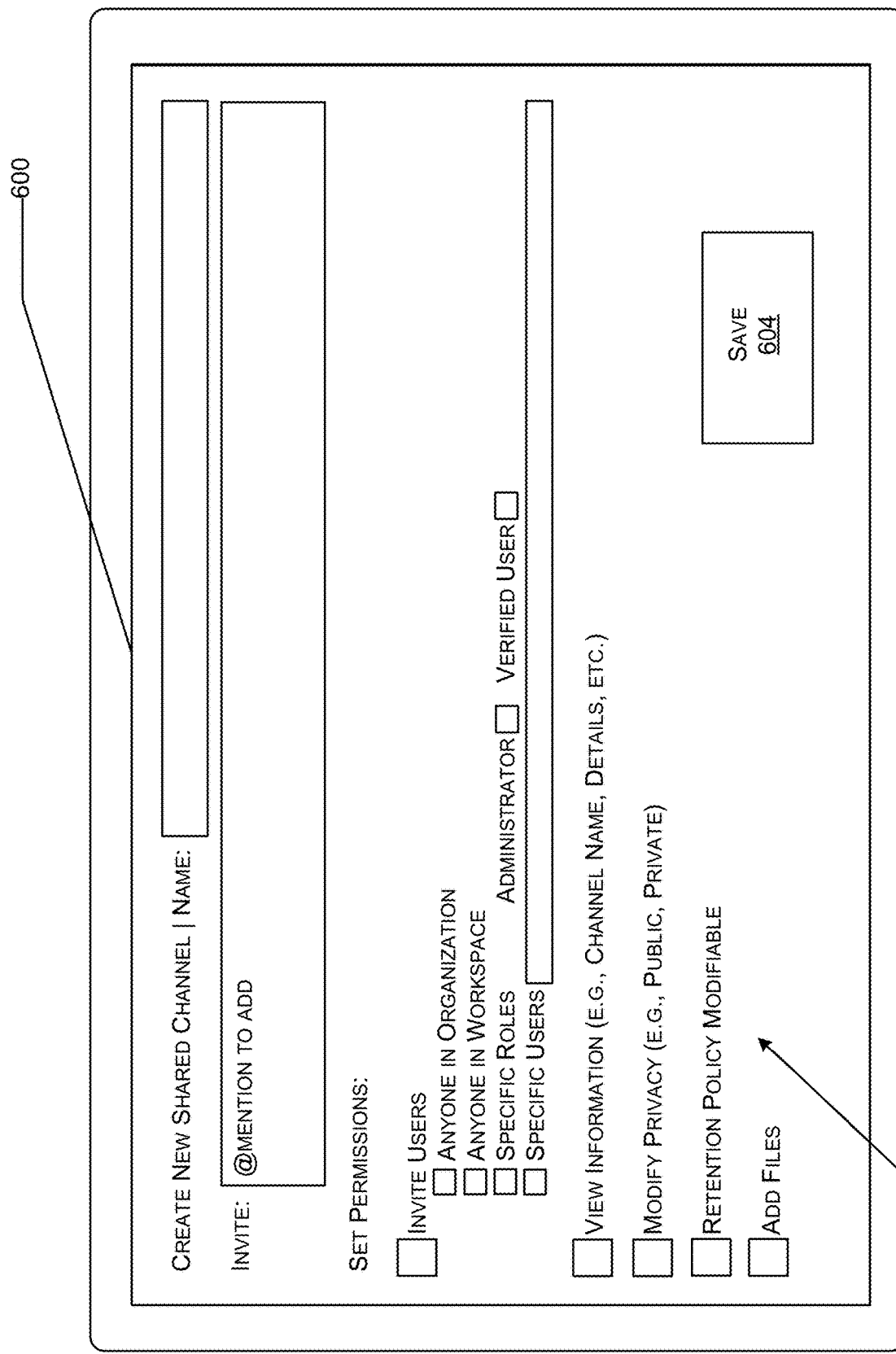
FIG. 6 illustrates an example user interface for enabling a user to set permission(s) associated with a communication channel, as described herein.

FIG. 6 illustrates an example user interface 600 for enabling a user to set permission(s) associated with a communication channel, as described herein. In at least one example, the user interface 600 can be presented via the application 140, via the user computing device 104. For instance, if the user of the user computing device 104 is designating permissions for an organization with which it is associated, such a user interface 600 can be presented. In at least one example, the user interface 600 can include visual elements 602 which can represent information and/or different permissions that the user can set for the communication channel. For example, the visual elements 602 can include a text box for the user to name the new communication channel, a text box for the user to invite other users to join the new communication channel, and one or more permissions to indicate who can invite users to join the channel (e.g., anyone in the invited organization, anyone associated with a workspace, users having specific roles, specific users, etc.), whether information associated with the new communication channel is viewable by other users and/or organizations, whether privacy settings associated with the new communication channel can be modified, whether a retention policy associated with the new communication channel can be modified, whether files can be added to the new communication channel, and/or the like. In at least one example, the user can interact with the user interface 600—for example by actuating a control 604—to save such information and/or permissions. In such an example, the application 140 can send indications of such information and/or permissions to the server(s) 102 and the permissions management component 116 and/or the channel management component 118 can analyze such information and/or permissions and cause indications of such to be stored in the datastore 122.

While FIG. 6 describes a user interface 600 that can be presented in association with the generation of a new communication channel, in some examples, a similar user interface can be presented in association with setting permissions and/or otherwise providing information for an existing communication channel. As described above, such techniques can be applicable for setting permissions and/or otherwise providing information for external channels, internal channels, or the like.

The user interface 600 is a non-limiting example of a user interface that can be presented via the user computing device 104 (e.g., by the application 140). In some examples, the application 140 can receive data from the permissions management component 116 and/or channel management component 118 and the application 140 can generate and present the user interface 600 based on the data. In other examples, the application 140 can receive data and/or instructions for generating the user interface 600 from the permissions management component 116 and/or channel management component 118. In such an example, the application 140 can present the user interface 600 based on the instructions. Additional or alternative data can be presented via a user interface and additional or alternative configurations can be imagined.

To the extent that FIGS. 1-6 describe visual elements or indicators that are presented via the user interface, non-limiting examples of such visual elements or indicators can include icons, symbols, links, tabs, or other user interface elements or objects. As described above, in some examples, such visual elements or indicators can be selectable or otherwise interactable to detect an input via the user interface(s). In some examples, such information can be output via additional or alternative user interfaces, for example via spoken output or the like. Reference to mechanisms, controls, links, etc. can refer to any user interface element that can be configured to receive input from a user such that the application 140 can detect the input and transmit the input to the server(s) 102 to perform operations as described herein.

In some examples, a user can access a user interface that identifies various communication channels and permission(s) associated with each communication channel. In some examples, such a user interface can indicate one or more policies that are affecting one or more communication channels associated with an organization. By accessing individual of the policies, a user can view which permission(s) are associated with each policy and/or which communication channels are associated with each policy. Additional or alternative configurations for understanding which policies have been agreed to and which communication channels are associated with such policies are within the scope of this disclosure.

FIGS. 7-11 are flowcharts showing example processes involving techniques as described herein. The processes illustrated in FIGS. 7-11 are described with reference to components described above with reference to the environment 100 shown in FIG. 1 for convenience and ease of understanding. However, the processes illustrated in FIGS. 7-11 are not limited to being performed using the components described above with reference to the environment 100. Moreover, the components described above with reference to the environment 100 are not limited to performing the processes illustrated in FIGS. 7-11.

The processes in FIGS. 7-11 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 7-11 can be combined in whole or in part with each other or with other processes.

As noted above, the processes illustrated in FIGS. 7-11 are described with reference to components described above with reference to the environment 100 shown in FIG. 1 for convenience and ease of understanding. FIG. 1, however, illustrates a single user computing device 104. In practice, the environment 100 can have multiple (e.g., tens of, hundreds of, thousands of, millions of, etc.) user computing devices that are each similarly configured to the user computing device 104. FIGS. 7-11 describe interactions between two or more user computing devices, each which can be configured similarly to the user computing device 104, and/or the server(s) 102.

Figure 7:
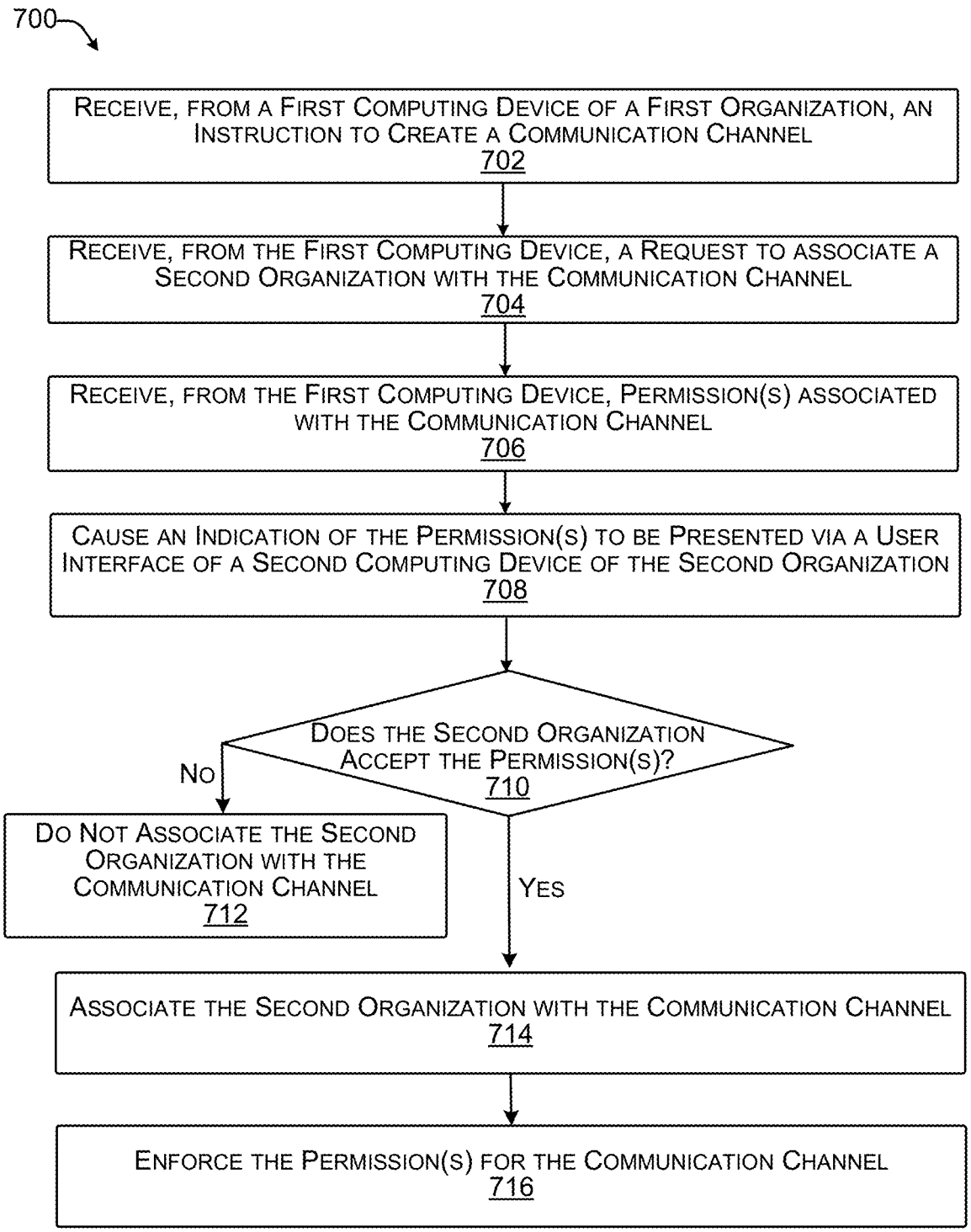
FIG. 7 illustrates an example process for enforcing permission(s) associated with a shared communication channel, as described herein.

FIG. 7 illustrates an example process 700 for enforcing permission(s) associated with a shared communication channel, as described herein.

At operation 702, the channel management component 118 can receive, from a first computing device of a first organization, an instruction to create a communication channel. In at least one example, a user associated with a first organization can interact with a user interface presented via a user computing device to request to create a communication channel. The request can be received by the channel management component 118, which can establish a communication channel between and among various user computing devices, allowing the user computing devices to communicate and share data between and among each other. In at least one example, the channel management component 118 can manage such communications and/or sharing of data.

At operation 704, the channel management component 118 can receive, from the first computing device, a request to associate a second organization with the communication channel. In at least one example, the first organization can request to add a second organization to the communication channel so that users of both the first organization and the second organization can communicate and share data between and among each other (e.g., using their respective computing devices). As described above, the second organization can be associated with a different organization identifier such that data associated with the first organization and data associated with the second organization are generally not accessible to one another due to privacy settings.

At operation 706, the permissions management component 116 can receive, from the first computing device, permissions(s) associated with the communication channel. In at least one example, the first organization can desire to control permissions associated with the communication channel. In such an example, a user associated with the first organization can interact with a user interface to set permissions. In some examples, as described above, such permissions can be applicable to all externally shared communication channels associated with the first organization, for all externally shared communication channels associated with a workspace of the first organization, for a particular externally shared communication channel, individuals associated with externally shared communication channels, and the like.

In some examples, such permissions can be set when a new communication channel is created, when a communication channel is shared with another organization, when a privacy setting of a communication channel changes, or at any other time. That is, in some examples, such permissions can be received with the request described above with reference to operation 702 and/or operation 704. In other examples, the permissions can be set at an additional or alternative time.

As described above, in some examples, an administrator or other user of the first organization can set permissions that indicate whether information associated with a communication channel (e.g., name, details, description, etc.) is viewable by other users and/or organization(s), whether other users can modify privacy settings associated with the communication channel (e.g., private, public, etc.), whether other users can add one or more other users and/or organizations to the communication channel, one or more users who are permitted to add one or more other users and/or organizations to the communication channel, one or more roles of users who are permitted to add one or more other users and/or organizations to the communication channel, whether the other users can add files or other content to the communication channel, a retention policy associated with content associated with the communication channel, types of users (e.g., administrators, verified users, groups of users, etc.) that can access the communication channel, and/or the like. As described above, in at least one example, such permission(s) can be associated with an organization (e.g., the second organization), a workspace associated with the second organization, specified users of the second organization, individual communication channels, or the like.

At operation 708, the permissions management component 116 can cause an indication of the permission(s) to be presented via a user interface of a second computing device of the second organization. In at least one example, the permissions management component 116 can send an indication of the permission(s) to a second computing device operable by a user of the second organization. In some examples, the user is an administrator. In other examples, the user may be another user associated with the organization. In some examples, the indication of the permission(s) can be presented in association with an invitation to join the communication channel, for example, as illustrated in the user interface 144 as described in FIG. 1 above. In some examples, the indication of the permission(s) can be presented in association with a notification that the permission(s) conflict with permission(s) of the second organization, for example, as illustrated in FIG. 5 above. In some examples, the indication of the permission(s) can be presented responsive to such permission(s) being set by the first organization, upon request from a user of the second organization, and/or the like.

At operation 710, the permissions management component 116 can determine whether the second organization accepts the permission(s). In at least one example, the permissions management component 116 can wait a predetermined period of time, a predetermined number of attempts, or the like to determine whether the second organization (e.g., a user associated therewith) accepts the permission(s). In some examples, a user interface presented via the second computing device can include a control or other mechanism to enable a user associated with the second organization to accept the permission(s). In some examples, requesting to join a communication channel can provide implied consent to accept the permission(s). Based at least in part on the user providing input indicating agreement to the permission(s), the second computing device can send an indication of such input to the server(s) 102, which can be received by the permissions management component 116.

At operation 712, the channel management component 118 can refrain from associating the second organization with the communication channel. If a user of the second organization does not accept the permission(s) within the predetermined period of time, after a predetermined number of attempts, or the like (i.e., "no" at operation 710), the channel management component 118 can refrain from associating the second organization with the communication channel.

At operation 714, the channel management component 118 can associate the second organization with the communication channel. In at least one example, if a user of the second organization accepts the permission(s) within the predetermined period of time, within a predetermined number of attempts, or the like (i.e., "yes" at operation 710), the channel management component 118 can receive an indication of such from the permissions management component 116 and can associate the second organization with the communication channel. The resulting communication channel can be a shared communication channel, which can also be referred to as an "externally shared communication channel."

At operation 716, the permissions management component 116 and/or the channel management component 118 can enforce the permission(s) for the communication channel. In at least one example, the communication channel can be associated with the permission(s). That is, the permission data 126 and/or the channel data 130 can indicate what operations are permissible for the communication channel. Such data can be used by the permissions management component 116 and/or the channel management component 118 to control operations performed in association with the communication channel.

In at least one example, the permissions management component 116 can receive requests to perform operations in association with the communication channel (e.g., via the channel management component 118), access the permission data 126 and/or the channel data 130 to determine whether such operations are permissible, and, if such operations are permissible, effectuate the operations. Additional details of such enforcement are described below with reference to FIG. 8. In another example, the permissions management component 116 can identify which operations are not permissible and can prohibit such operations from being performed. For example, in such an example, the permissions management component 116 may indicate which operations are not permissible and the channel management component 118 can refrain from presenting such operations as options via user interfaces. As such, if such operations are not permissible, users may not be given the option to perform them.

Figure 8:
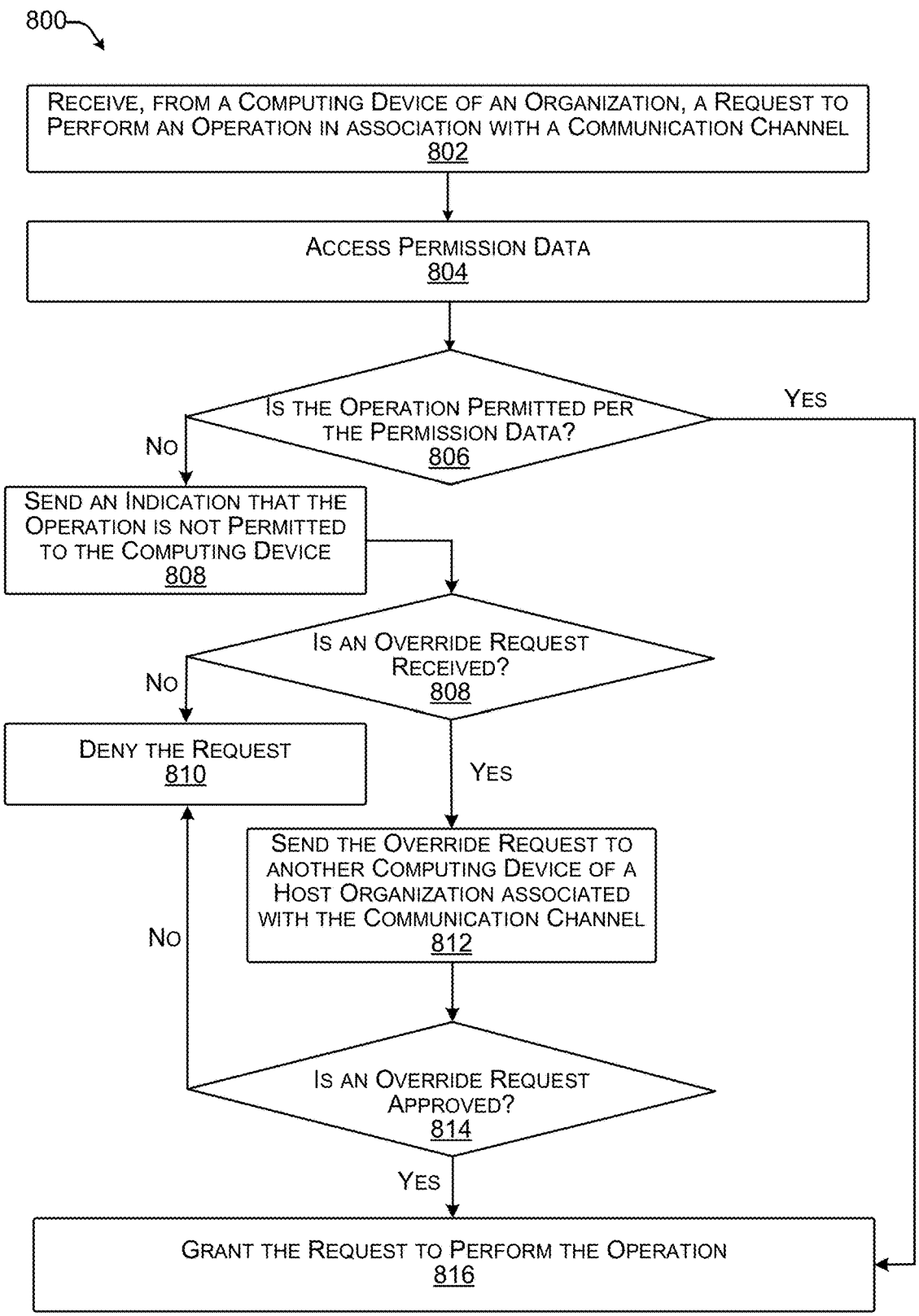
FIG. 8 illustrates another example process for enforcing permission(s) associated with a shared communication channel, as described herein.

FIG. 8 illustrates another example process 800 for enforcing permission(s) associated with a shared communication channel, as described herein.

At operation 802, the channel management component 118 can receive, from a computing device of an organization, a request to perform an operation in association with a communication channel. In at least one example, a user of a user computing device can interact with a user interface presented via the user computing device to request to perform an operation. For example, such an operation can be viewing information associated with the communication channel (e.g., a name of the communication channel, details associated with the communication channel, description of the communication channel, etc.), modifying a privacy setting associated with the communication channel, adding a user to the communication channel, removing a user from a communication channel, adding a file or other content to the communication channel, modify a retention policy associated with the communication channel, or the like. In at least one example, an application on the user computing device (e.g., application 140) can receive the request to perform the operation and can send the request to the channel management component 118.

At operation 804, the permissions management component 116 can access the permission data. In at least one example, the channel management component 118 can forward the request to the permissions management component 116, which can access the permission data 126 (and/or the channel data 130), to determine whether the operation is permitted, as illustrated at operation 806. If the operation is not permitted per the permission data 126 (i.e., "no" at operation 806), the permissions management component 116 can notify the channel management component 118, and the channel management component 118 can send an indication that the operation is not permitted to the user computing device, as illustrated at operation 808. In some examples, a user interface can be presented via the user computing device operable by the user, which can indicate that the operation is not permitted. Examples of such an indication presented via a user interface are described above with reference to the notifications presented with reference to FIGS. 3 and 4. In at least one example, the user interface can include a control or other mechanism to enable the user to request to override the permission that is preventing them from performing the operation. In at least one example, the permissions management component 116 can determine whether an override request is received, as illustrated at operation 808. If no override request is received (i.e., "no" at operation 808), the permissions management component 116 can deny the request, as illustrated at operation 810. In some examples, the channel management component 118 can send a notification to the user computing device 104 indicating that the request has been denied and that the operation is not permitted.

At operation 812, the permissions management component 116 can send the override request to another computing device of a host organization associated with the communication channel. That is, if an override request is received (i.e., "yes" at operation 808), the permissions management component 116 can send the request to another computing device of a host organization associated with the communication channel. As described above with reference to FIG. 7, in some examples, an organization that hosts a communication channel can set permissions for the communication channel. In some examples, however, a user of an invited organization can request to override a permission. In such examples, the override request can be sent to the host organization (e.g., a user computing device associated therewith) to determine whether the second organization approves the override request.

At operation 814, the permissions management component 116 can determine whether the override request is approved. If the host organization approves the override request, a user computing device associated therewith can send an indication that the override request is approved to the server(s) 102. The permissions management component 116 can receive the override request and, if the override request is approved (i.e., "yes" at operation 114), the permissions management component 116 can grant the request to perform the operation, as illustrated at operation 816. That is, the permissions management component 116 can notify the channel management component 118 that the operation is permitted. In such an example, the channel management component 118 can execute the requested operation. In an example where the operation is performed responsive to an override request being approved, the channel management component 118 can send a notification to the user computing device to indicate that the override request was approved.

In some examples, if the operation is permitted per the permission data 126 (i.e., "yes" at operation 806), the channel management component 118 can perform the operation.

If the override request is not approved (i.e., "no" at operation 814), the permissions management component 116 can deny the request, as illustrated at operation 810.

Figure 9:
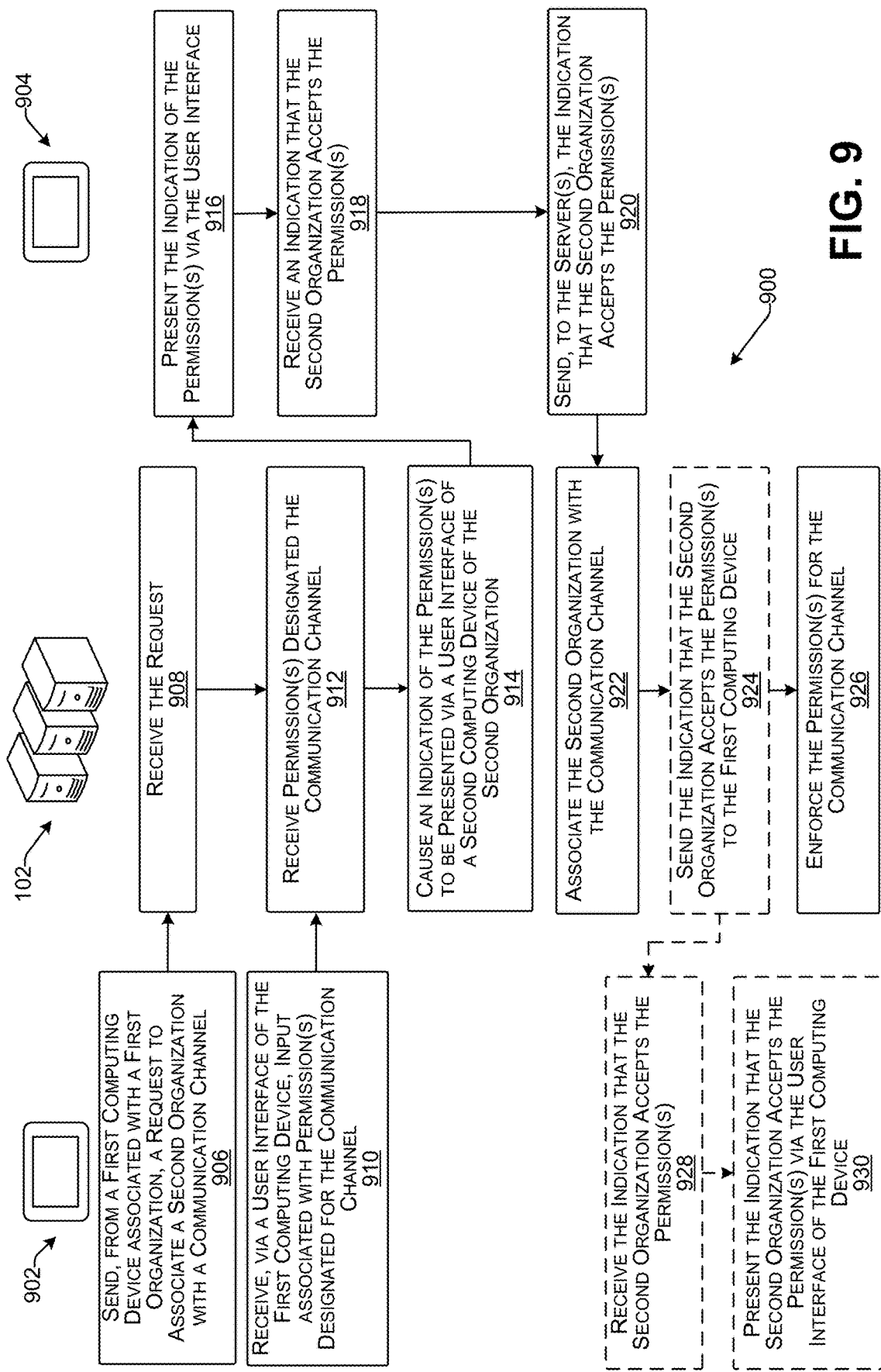
FIG. 9 illustrates yet another example process for enforcing permission(s) associated with a shared communication channel, as described herein.

FIG. 9 illustrates yet another example process 900 for enforcing permission(s) associated with a shared communication channel, as described herein. FIG. 9 illustrates two computing devices that are operable by users: a first computing device 902, which can be associated with a first organization, and a second computing device 904, which can be associated with a second organization. In at least one example, the first computing device 902 and the second computing device 904 are each configured similar to the user computing device 104, described above with reference to FIG. 1. Operations shown below each of the computing devices can be performed by the respective computing device. Operations shown below the server(s) 102 can be performed by the server(s) 102.

At operation 906, an application, such as the application 140, executable by the first computing device 902 can send a request to associate a second organization with a communication channel. In some examples, the communication channel can be an existing communication channel. In other examples, the communication channel can be a new communication channel. In at least one example, a user associated with a first organization can interact with a user interface presented via the first computing device 902 to request to associate a second organization with a communication channel. In at least one example, the first organization can request to add a second organization to the communication channel so that users of both the first organization and the second organization can communicate and share data between and among each other (e.g., using their respective computing devices). As described above, the second organization can be associated with a different organization identifier such that data associated with the first organization and data associated with the second organization are generally not accessible to one another due to privacy settings. The request can be received by the channel management component 118, as illustrated at operation 908.

At operation 910, the application executable by the first computing device 902 can receive input associated with permission(s) designated for the communication channel. In at least one example, the first organization can desire to control permissions associated with the communication channel. In such an example, a user associated with the first organization can interact with a user interface to set permissions. In some examples, as described above, such permissions can be applicable to all externally shared communication channels associated with the first organization, for all externally shared communication channels associated with a workspace of the first organization, for a particular externally shared communication channel, individuals associated with externally shared communication channels, and the like. At operation 912, the permissions management component 116 can receive, from the first computing device 902, permissions(s) associated with the communication channel. In some examples, such permissions can be set when a new communication channel is created, when a communication channel is shared with another organization, when a privacy setting of a communication channel changes, or at any other time. That is, in some examples, such permissions can be received with the request described above with reference to operations 906 and/or 908. In other examples, the permissions can be set at an additional or alternative time.

As described above, in some examples, an administrator or other user of the first organization can set permissions that indicate whether information associated with a communication channel (e.g., name, details, description, etc.) is viewable by other users and/or organization(s), whether other users can modify privacy settings associated with the communication channel (e.g., private, public, etc.), whether other users can add one or more other users and/or organizations to the communication channel, one or more users who are permitted to add one or more other users and/or organizations to the communication channel, one or more roles of users who are permitted to add one or more other users and/or organizations to the communication channel, whether the other users can add files or other content to the communication channel, a retention policy associated with content associated with the communication channel, types of users (e.g., administrators, verified users, groups of users, etc.) that can access the communication channel, and/or the like. As described above, in at least one example, such permission(s) can be associated with an organization (e.g., the second organization), a workspace associated with the second organization, specified users of the second organization, individual communication channels, or the like.

At operation 914, the permissions management component 116 can cause an indication of the permission(s) to be presented via a user interface of the second computing device 904, which can be associated with the second organization. In at least one example, the permissions management component 116 can send an indication of the permission(s) to the second computing device 904 and the second computing device 904 (e.g., an application associated therewith, such as the application 140) can present the indication of the permission(s) via the user interface, as illustrated at operation 916. In some examples, the indication of the permission(s) can be presented in association with an invitation to join the communication channel, for example, as illustrated in the user interface 144 as described in FIG. 1 above. In some examples, the indication of the permission(s) can be presented in association with a notification that the permission(s) conflict with permission(s) of the second organization, for example, as illustrated in FIG. 5 above. In some examples, the indication of the permission(s) can be presented responsive to such permission(s) being set by the first organization, upon request from a user of the second organization, and/or the like.

At operation 918, the second computing device 904 can receive an indication that the second organization accepts the permission(s). In some examples, a user interface presented via the second computing device 904 can include a control or other mechanism to enable a user associated with the second organization to accept the permission(s). In some examples, the user interface can also include a control or other mechanism to enable the user to reject the permission(s). In some examples, requesting to join a communication channel can provide implied consent to accept the permission(s). Based at least in part on the user providing input indicating agreement to the permission(s) (e.g., by explicitly accepting the permission(s) or implicitly via requesting to join the communication channel), the second computing device 904 can send an indication of such input to the server(s) 102, as illustrated at operation 920, which can be received by the permissions management component 116.

At operation 922, the channel management component 118 can associate the second organization with the communication channel. In at least one example, if a user of the second organization accepts the permission(s) within the predetermined period of time, within a predetermined number of attempts, or the like (i.e., "yes" at operation 710), the channel management component 118 can receive an indication of such from the permissions management component 116 and can associate the second organization with the communication channel. The resulting communication channel can be a shared communication channel, which can also be referred to as an "externally shared communication channel."

At operation 924, which can be optional, the channel management component 118 can send an indication that the second organization accepts the permission(s) to the first computing device 902. The first computing device 902 can receive the indication, as illustrated at operation 928, and can present the indication that the second organization accepts the permission(s) via the user interface of the first computing device 902, as illustrated at operation 930. That is, the application executable by the first computing device 902 can receive the indication can present the indication via the user interface of the first computing device 902.

At operation 926, the permissions management component 116 and/or the channel management component 118 can enforce the permission(s) for the communication channel. That is, the permission data 126 and/or the channel data 130 can indicate what operations are permissible for the communication channel. Such data can be used by the permissions management component 116 and/or the channel management component 118 to control operations performed in association with the communication channel.

In at least one example, the permissions management component 116 can receive requests to perform operations in association with the communication channel (e.g., via the channel management component 118), access the permission data 126 and/or the channel data 130 to determine whether such operations are permissible, and, if such operations are permissible, effectuate the operations. Additional details of such enforcement are described above with reference to FIG. 8. In another example, the permissions management component 116 can identify which operations are not permissible and can prohibit such operations from being performed. For instance, in such an example, the permissions management component 116 may indicate which operations are not permissible and the channel management component 118 can refrain from presenting such operations as options via user interfaces. As such, if such operations are not permissible, users may not be given the option to perform them.

Figure 10:
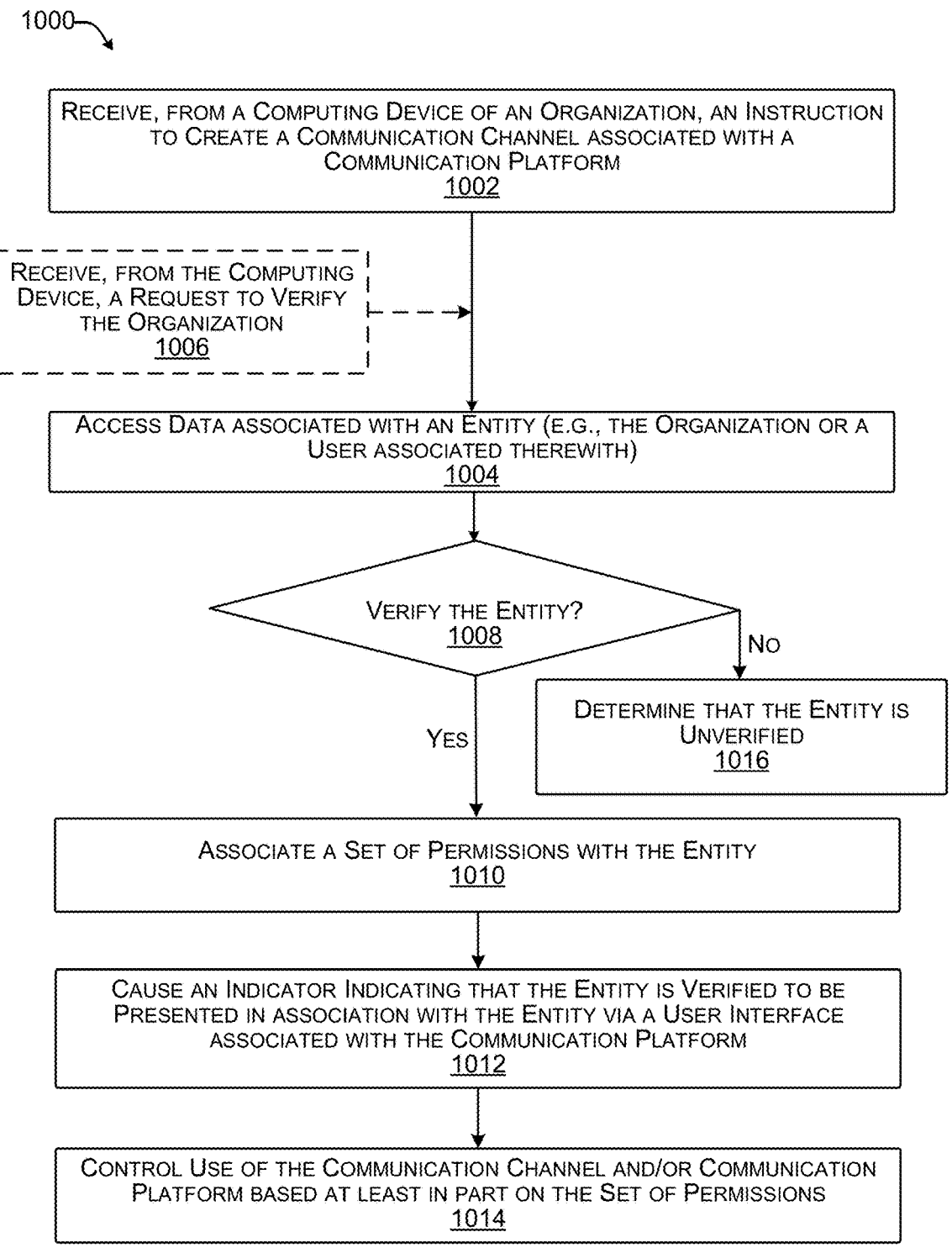
FIG. 10 illustrates an example process for verifying an entity, as described herein.

FIG. 10 illustrates an example process 1000 for verifying an entity, as described herein.

At operation 1002, the channel management component 118 can receive, from a computing device of an organization, an instruction to create a communication channel associated with a communication platform. In some examples, the computing device can be associated with an administrator of the organization or another user associated with the organization. In at least one example, based at least in part on receiving the instruction, the channel management component 118 can establish a communication channel between and among various user computing devices, allowing the user computing devices to communicate and share data between and among each other.

At operation 1004, the permissions management component 116 can access data associated with an entity (e.g., the organization or a user associated therewith). In at least one example, the permissions management component 116 can access data associated with the organization and/or a user associated therewith. In such an example, the permissions management component 116 can access the datastore 122 and access user data 124 and/or group data 128 stored therein. In at least one example, the permissions management component 116 can access at least one of an address associated with the entity, a web site associated with the entity, an email domain associated with the entity, account activity associated with the entity, and/or the like from the datastore 122. In some examples, the permissions management component can access data from third-party data sources (e.g., third-party data).

In at least one example, the permissions management component 116 can access such data based at least in part on receiving a request, from the computing device of the organization to verify the organization, as illustrated at operation 1006. That is, in some examples, an organization and/or a user can desire to verify itself to obtain a higher level of access to communication channels and/or the communication platform. In such examples, the organization and/or a user can interact with a user interface to request verification. The computing device presenting such a user interface can send, for example, via an application operable thereon (e.g., the application 140), an indication of the request for verification, which can be received by the permissions management component 116.

At operation 1008, the permissions management component 116 can determine whether to verify the entity. In at least one example, if the entity is a user, the permissions management component 116 can analyze the user data 124 and/or third-party data to determine whether to verify the user. In some examples, the permissions management component 116 can verify individual users to ensure that the users are who they say they are and/or to ensure that such individual users are legitimate. In some examples, such verification can be done via Domain Name System (DNS) and/or Secure Socket Layer (SSL) certification verification, two-factor or multi-factor verification using email, text message, biometrics, or the like, manual review (e.g., checking for managed accounts, non-malicious activity, legitimate activity, etc.), or the like. In some examples, third-party data can be used to verify a user (e.g., address, website, social media, etc.).

In some examples, wherein the entity is an organization, the permissions management component 116 can analyze the group data 128 and/or third-party data to determine whether to verify the organization. In some examples, the permissions management component 116 can verify individual groups, such as organizations, to ensure that the organizations are who they say they are and/or to ensure that such individual organizations are legitimate. In some examples, such verification can be done via Domain Name System (DNS) and/or Secure Socket Layer (SSL) certification verification, two-factor or multi-factor verification using email, text message, biometrics, or the like, manual review (e.g., checking for managed accounts, non-malicious activity, legitimate activity, etc.), or the like. In some examples, third-party data can be used to verify an organization (e.g., business address, website, social media, etc.).

In some examples, the permissions management component 116 can present user interface(s) to a user associated with the communication platform such that the user can review the user data 124, group data 128, and/or third-party data via a manual review process through which such a user can provide an indication that the entity is verified. In some examples, the permissions management component 116 can utilize a machine-trained data model to analyze the user data 124, group data 128, and/or third-party data to determine whether to verify the entity. In such an example, the machine-trained data model can output a score or other metric indicating whether the entity is likely to be who they say they are and/or a legitimacy associated with the entity. In such an example, if the score or other metric meets or exceeds a threshold, the permissions management component 116 can determine that the entity is verified.

At operation 1010, the permissions management component 116 can associate a set of permissions with the entity. In at least one example, based at least in part on determining that the entity is verified (i.e., "yes" at operation 1008), the permissions management component 116 can associate a set of permissions with the entity. The set of permissions can indicate how the entity is able to interact with the communication channel and/or the communication platform. For example, the set of permissions associated with a verified user can indicate whether information associated with a communication channel and/or communication platform can be viewed by a user, whether privacy settings associated with a communication channel can be modified by the user, whether the user can add other users and/or other organizations to the communication channel and/or communication platform, whether the user can add files and/or other content to the communication channel and/or communication platform by the user, etc. In some examples, verified users can be associated with a first level of access (e.g., which can be defined by permissions) that is greater than a second level of access (e.g., which can be defined by permissions) provided to unverified users. For example, verified users can add other users and/or organizations to a communication channel and/or shared communication channel without administrative approval, whereas unverified users may need to go through an administrator to do so. As another example, verified users can set up shared communication channels without administrative approval, wherein unverified users may need to go through an administrator to do so. In at least one example, an indication of the permissions associated with the entity can be stored in the user data 124, the permission data 126, the group data 128, and/or the channel data 130.

At operation 1012, the permissions management component 116 can cause an indicator indicating that the entity is verified to be presented in association with the entity via a user interface associated with the communication platform. In some examples, the permissions management component 116 can associate an indicator with the entity indicating that the entity has been verified. If an entity is an organization or other group, individual users associated with a verified organization or other group can be associated with an indicator that the organization or other group with which it is associated is verified. The indicator can comprise a symbol, icon, or other indicator and can be presented in association with information about the entity on user interfaces as described herein to visually indicate that the entity has been verified. A non-limiting example of such an indicator (e.g., visual element 212) is provided in FIG. 2, above. In at least one example, such an indicator can be associated with the entity so long as the entity is verified. In at least one example, such an indicator can be positioned proximate to a representation of the entity in each user interface the representation of the entity is presented. That is, such an indicator can be presented in association with a profile of the entity, messages or other content posted by the entity (e.g., in the a second region 148, or pane, of the user interface 144 that can be associated with a data feed (or, "feed") indicating messages posted to and/or actions taken with respect to one or more communication channels and/or other virtual spaces for facilitating communications, as described above), invitations, requests, or other data associated with the entity.

At operation 1014, the permissions management component 116 and/or the channel management component 118 can control use of the communication channel and/or communication platform based at least in part on the set of permissions. That is, in some examples, the user data 124, the permission data 126, the group data 128, and/or the channel data 130 can indicate what operations are permissible for the entity and/or users associated therewith. Such data can be used by the permissions management component 116 and/or the channel management component 118 to control operations performed in association with the communication channel and/or the communication platform.

In at least one example, the permissions management component 116 can receive requests to perform operations in association with the communication channel (e.g., via the channel management component 118), access the user data 124, the permission data 126, the group data 128, and/or the channel data 130 to determine whether such operations are permissible (e.g., per the set of permissions), and, if such operations are permissible, effectuate the operations. In another example, the permissions management component 116 can identify which operations are not permissible (e.g., per the set of permissions) and can prohibit such operations from being performed. For example, in such an example, the permissions management component 116 may indicate which operations are not permissible and the channel management component 118 can refrain from presenting such operations as options via user interfaces. As such, if such operations are not permissible, users may not be given the option to perform them.

In some examples, the set of permissions can be used by the permissions management component 116 and/or the channel management component 118 to determine whether to permit requests from external endpoints, such that may be received in association with a direct message from a user that is associated with a different organization and/or workspace, an access request for a guest user (e.g., a user that is not associated with a user identifier or other identifier of the communication platform) to access the communication channel or communication platform, an invitation to establish an externally shared communication channel with the organization, and/or the like. In some examples, such requests (e.g., requests from external endpoints) may not be permitted if the requesting entity is not verified. In some examples, such requests (e.g., requests from external endpoints) may be permitted but may be associated with an indication that the requesting entity is not verified. Additional details are described below with reference to FIG. 11.

At operation 1016, the permissions management component 116 can determine that the entity is unverified. In such an example, the permissions management component 116 can refrain from associating the set of permissions for verified entities with the entity. As described above, unverified entities can have less access to the communication channel and/or communication platform. Further, unverified entities may not be associated with an indicator indicating that they are verified. In some examples, unverified entities can be associated with a different indicator indicating that the entities are unverified.

In at least one example, the process 1000 can be repeated at a designated frequency, after a lapse of a period of time, on request of a user, and/or the like such to re-evaluate whether the entity remains verified. That is, the permissions management component 116 can track and/or monitor entities to ensure that an entity that is verified remains verified, and if, at a later time, an entity is determined to no longer be verified, the permissions management component 116 can modify permission(s) associated therewith and remove the association between the indication and the entity.

Figure 11:
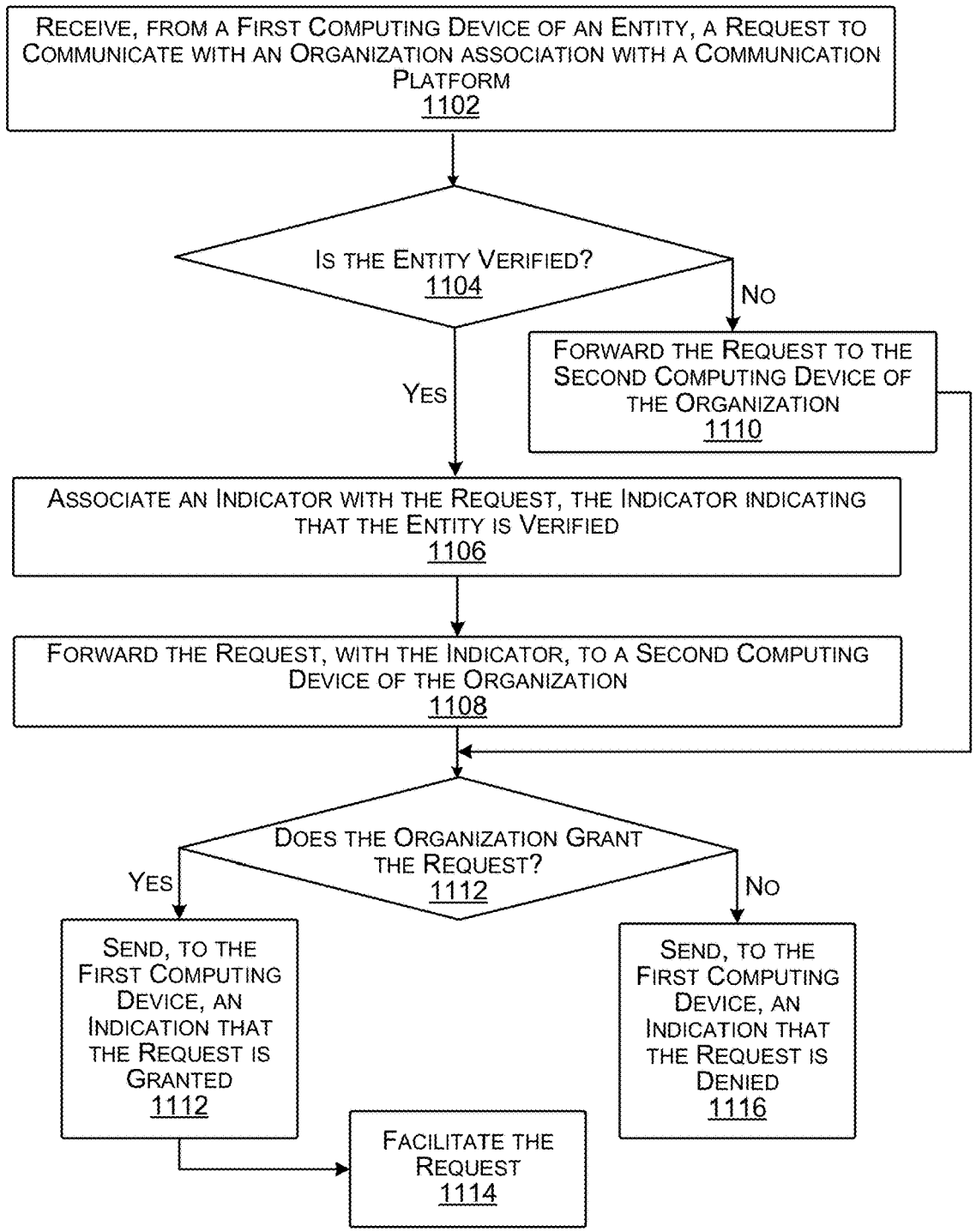
FIG. 11 illustrates an example process for managing requests associated with a communication platform based on whether an entity is verified, as described herein.

FIG. 11 illustrates an example process 1100 for managing requests associated with a communication platform based on whether an entity is verified, as described herein.

At operation 1102, the channel management component 118 can receive, from a first computing device of an entity, a request to communicate with an organization associated with a communication platform. In at least one example, the channel management component 118 can receive requests to communicate or otherwise interact with organizations, users, or the like via the communication platform. In some examples, such requests can be associated with internal endpoints (e.g., users, workspaces, etc. associated with a same organization). In some examples, such requests can be associated with external endpoints (e.g., users, workspaces, organizations, etc.) associated with a different organization (e.g., organization identifier) than the organization or is not associated with an organization at all (e.g., a guest user). In at least one example, a request can be associated with a direct message from a user that is associated with a different organization than the organization, an access request for a guest user (e.g., a user that is not associated with a user identifier or other identifier of the communication platform) to access the communication channel or communication platform, an invitation to establish an externally shared communication channel with the organization, and/or the like.

At operation 1104, the permissions management component 116 can determine whether the entity is verified. In at least one example, the permissions management component 116 can determine whether the entity associated with the request is verified. In some examples, the request can be associated with an identifier of the requesting entity, which can be used by the permissions management component 116 to determine whether the datastore 122 is associated with any data corresponding to the requesting entity and/or access data associated with the requesting entity in the datastore 122. In such examples, the permissions management component 116 can analyze data associated with the requesting entity to determine whether the data indicates that the requesting entity is verified.

At operation 1106, the permissions management component 116 can associate an indicator with the request, the indicator indicating that the entity is verified. In at least one example, if the entity is verified (i.e., "yes" at operation 1104), the permissions management component 116 can associate an indicator with the request to indicate that the entity is verified and can forward the request, with the indicator, to a second computing device of the organization, as illustrated at operation 1108.

If the entity is not verified, the permissions management component 116 can forward the request to the second computing device of the organization, for instance, without the indicator indicating that the entity is verified. In some examples, the permissions management component 116 can provide the indication of whether the entity is verified and the channel management component 118 can determine whether to associate the indicator and forward the request, as illustrated at operations 1108 and 1110.

At operation 1112, the channel management component 118 can determine whether the organization grants the request. In at least one example, the channel management component 118 can wait a predetermined amount of time after forwarding the request, a designated number of attempts (e.g., of resending the request), and/or the like for an indication from the second computing device of whether the second computing device grants the request. In some examples, the organization (or user associated therewith) can utilize the presence or absence of an indicator indicating that an entity is verified to determine whether to grant the request. In some examples, an administrator may be required to grant or otherwise authorize the request. In some examples, a verified user can grant or otherwise authorize the request, without the need for an administrator. In some examples, a user associated with a particular role can be permitted to grant or otherwise authorize the request for the organization. In some examples, a designated user can be permitted to grant or otherwise authorize the request.

Based at least in part on the organization granting the request (i.e., "yes" at operation 1110), the channel management component 118 can send an indication that the request has been granted to the first computing device, as illustrated at operation 1112, and can facilitate the request, as illustrated at operation 1114. That is, if the request is associated with a direct message from a user that is associated with a different organization than the organization the channel management component 118 can send the direct message to the intended recipient. If the request is an access request for a guest user (e.g., a user that is not associated with a user identifier or other identifier of the communication platform) to access the communication channel or communication platform the channel management component 118 can grant the guest user access. If the request is for an invitation to establish an externally shared communication channel with the organization, the channel management component 118 can establish the externally shared communication channel.

In at least one example, if the organization does not grant the request, the channel management component 118 can send, to the first computing device, an indication that the request is denied, as illustrated at operation 1116.

In some examples, as described above, requests from external endpoints may not be permitted if the requesting entity is not verified. That is, in some examples, if the request received at operation 1102 is not sent by a verified entity, the permissions management component 116 can refuse to forward the request unless or until the entity is verified. In such an example, the entity can request verification or otherwise be verified by the process 1000 described above with reference to FIG. 10.

Techniques described above with reference to FIGS. 1-11 are directed to, among other things, enabling a host organization to establish permissions for a communication channel that is shared with another organization. That is, in at least one example, an entity associated with a host organization (e.g., an administrator or other user) can set permissions associated with a communication channel that is to be shared with another organization (i.e., the "invited organization"). The invited organization can join the communication channel (thereby establishing a shared communication channel) and can use the communication channel within the scope of the permissions set by the host organization. In at least one example, such permissions can indicate whether information associated with the shared communication channel, as designated by the host organization (e.g., name, details, description, etc.), is viewable by the invited organization, whether the invited organization can modify privacy settings associated with the shared communication channel (e.g., private, public, etc.), whether the invited organization can add one or more users and/or other organizations to the shared communication channel, one or more users who are permitted to add one or more other users and/or other organizations to the shared communication channel, one or more roles of users who are permitted to add one or more other users and/or other organizations to the shared communication channel, whether the invited organization can add files or other content to the shared communication channel, a retention policy associated with content associated with the shared communication channel, types of users (e.g., administrators, verified users, groups of users, etc.) that can access the shared communication channel, and/or the like. In at least one example, such permission(s) can be associated with an organization (e.g., the invited organization), a workspace associated with the organization, specified users, the shared communication channel, or the like. In at least one example, the communication platform can enforce the permissions, thereby enabling more privacy and more security than is available with conventional shared communication channels.

As described above, from the user experience perspective, techniques described herein greatly enhance organizational productivity and efficiency. They also reduce the need for other forms of communications (such as electronic mail), and provide better collaboration between different organizations while eliminating channel disconnections between groups of users. In addition, techniques described herein are configured to provide asymmetrical and customizable privacy settings, where an externally shared communication channel between two organizations may have one privacy configuration for one organization and a different configuration for the other organization. In some examples, both privacy configurations can be designated by one organization (e.g., the host organization or the invited organization). Further, externally shared communication channels may create cross-network effects, which increases user retention rates from different organizations or different workspaces.

Furthermore, from a developer's perspective, techniques described herein provide support for the retrieval and appropriate visibility of data, while providing the flexibility of retention settings. Techniques described herein also enable the selective connection of communication channels, as well as groups of users based on communication channels.

As described above, techniques described herein provide improved privacy and security for communication channels that are part of a communication platform. This enables hosting organizations to better manage which external users can join externally shared communication channels, to better manage what information external users can access and/or interact with, and to better manage privacy settings associated with externally shared communication channels. That is, techniques described herein enable enhanced privacy and security and therefore offer improvements to existing shared communication channel technology.

In addition to managing permissions associated with hosted communication channels, techniques described herein are directed to verifying entities associated with the communication platform, to provide increased trust and security in the communication platform and/or communications associated with the communication platform. In some examples, by providing processes through which entities (e.g., organizations, groups, users, etc.) can be verified by the communication platform, interactions between entities can be streamlined. For example, by verifying organizations, a shared channel between the two organizations can be established without requiring approval from an administrator of the invited organization. As another example, by verifying users, verified users can perform certain operations (e.g., as designated by a set of permissions) that non-verified users cannot perform. In some examples, such operations can be operations that conventionally require administrator approval to perform. That is, by utilizing verification processes as described herein, end users can perform operations without involving additional users (e.g., administrators), which can reduce the number of interactions associated with the performance of such operations and can thereby increase the speed and efficiency with which such operations are performed. Such verification processes can thereby remove slowness associated with existing systems. Further such verification processes can increase security and thus confidence in communication platforms as described herein. Thus, techniques described herein can provide technical solutions to technical problems that provide an improvement to a technical process.

As such, techniques described herein provide specific, technical solutions to technical problems faced by existing systems, the details of which are described above.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented at least in part by one or more computing devices of a communication platform, the method comprising:
  receiving an instruction to create a communication channel on the communication platform, wherein the communication channel is associated with a first organization associated with the communication platform, and wherein the first organization is associated with one or more first permissions;
  receiving, from a first computing device associated with the first organization, a first request to associate a second organization that is different than the first organization with the communication channel, wherein the second organization is associated with one or more second permissions, wherein the first request is associated with one or more third permissions associated with the communication channel, and wherein the one or more third permissions are different than the one or more second permissions;
  causing the first request to be sent to a second computing device associated with the second organization, wherein the first request, when sent to the second computing device, is associated with (i) an indication of the one or more third permissions or (ii) an indication that the one or more third permissions are different than the one or more second permissions;
  based at least in part on receiving, from the second computing device associated with the second organization, an indication to associate the second organization with the communication channel, associating the second organization with the communication channel;
  receiving, from the second computing device, a second request to perform an operation associated with the communication channel;
  in response to a determination, based at least in part on the one or more third permissions, that the operation is permitted, performing the operation associated with the communication channel; and
  in response to a determination, based at least in part on the one or more third permissions, that the operation is not permitted:
    sending, to the second computing device, an indication that the operation is not permitted;
    receiving, from the second computing device, a third request to override a permission, of the one or more third permissions, associated with the operation;
    sending the third request to the first computing device;
    receiving, from the first computing device, an indication that the operation is permitted;
    based at least in part on receiving the indication that the operation is permitted, granting the second request to perform the operation; and
    sending the indication to the second computing device.

2. The method of claim 1, wherein the one or more third permissions indicate one or more of:
  whether information associated with the communication channel, as designated by the first organization, is viewable by the second organization;
  whether the second organization can modify privacy settings associated with the communication channel;
  whether the second organization can add one or more users or other organizations to the communication channel; or whether the second organization can add files or other content to the communication channel.

3. The method of claim 1, wherein the one or more third permissions indicate one or more of:
one or more users who are permitted to add one or more other users or other organizations to the communication channel;
one or more roles of users who are permitted to add one or more other users or other organizations to the communication channel;
a retention policy associated with content associated with the communication channel; or
that access to the communication channel is limited to verified users.

4. The method of claim 1, wherein the one or more third permissions are defined by the first organization and are applicable to at least one of (i) all communication channels associated with other organizations that are different than the first organization, (ii) all users of the second organization, (iii) one or more specified users of the second organization, or (iv) the communication channel.

5. The method of claim 1, wherein causing the first request to be sent to the second computing device comprises causing an invitation to join the communication channel to be presented via a user interface of the second computing device, wherein the invitation includes (i) the indication of the one or more third permissions or (ii) the indication that the one or more third permissions are different than the one or more second permissions.

6. The method of claim 5, wherein the invitation includes a control, actuation of which allows the second organization to join the communication channel, thereby agreeing to the one or more third permissions.

7. The method of claim 5, wherein the invitation includes a control, actuation of which allows the second organization to reject the one or more third permissions.

8. The method of claim 1, wherein the operation comprises:
presenting information associated with the communication channel;
modifying a privacy setting associated with the communication channel;
adding a user to the communication channel; or
adding a file or other content to the communication channel.

9. The method of claim 1, wherein the second organization is a verified organization, and wherein the verified organization is associated with a first level of access associated with the communication channel that is greater than a second level of access provided to an unverified organization.

10. The method of claim 1, wherein at least one third permission, of the one or more third permissions, is negotiable via a permission negotiation between a first user of the first organization and a second user of the second organization.

11. A system comprising:
one or more processors; and
one or more non-transitory computer-readable media storing instructions that, when executed by the one or more processors, cause the system to perform operations comprising:
receiving an instruction to create a communication channel on a communication platform, wherein the communication channel is associated with a first organization that is registered with the communication platform, and wherein the first organization is associated with a first set of permissions;
sending, to a second organization, a request to join the communication channel, wherein the second organization is different than the first organization, wherein the second organization is associated with a second set of permissions, wherein the communication channel is associated with a third set of permissions that are different than at least the second set of permissions for the second organization, wherein the first set of permissions and the third set of permissions are set by the first organization, and wherein the request to join the communication channel includes an indication of at least one of (i) the third set of permissions or (ii) an indication that the third set of permissions is different than the second set of permissions;
based at least in part on receiving a response to the request to join the communication channel, associating the second organization with the communication channel;
receiving, from a second computing device associated with the second organization, a second request to perform an operation associated with the communication channel;
in response to a determination, based at least in part on the one or more third permissions, that the operation is permitted, performing the operation associated with the communication channel; and
in response to a determination, based at least in part on the one or more third permissions, that the operation is not permitted:
sending, to the second computing device, an indication that the operation is not permitted;
receiving, from the second computing device, a third request to override a permission, of the one or more third permissions, associated with the operation;
sending the third request to a first computing device associated with the first organization;
receiving, from the first computing device, an indication that the operation is permitted;
based at least in part on receiving the indication that the operation is permitted, granting the second request to perform the operation; and
sending the indication to the second computing device.

12. The system of claim 11, wherein the third set of permissions is applicable to at least one of (i) all communication channels associated with other organizations that are different than the first organization, (ii) all users of the second organization, (iii) one or more specified users of the second organization, or (iv) the communication channel.

13. The system of claim 11, wherein a user associated with the first organization and the second organization is permitted to access the communication channel pursuant to the first set of permissions and the third set of permissions.

14. The system of claim 11, wherein sending the request to join the communication comprises causing an invitation to join the communication channel to be presented via a user interface of the second computing device, wherein the invitation includes (i) the indication of the one or more third permissions or (ii) the indication that the one or more third permissions are different than the one or more second permissions.

15. The system of claim 14, wherein the invitation includes a control, actuation of which allows the second organization to join the communication channel, thereby agreeing to the one or more third permissions.

16. The system of claim 11, wherein the operation comprises:
    presenting information associated with the communication channel;
    modifying a privacy setting associated with the communication channel;
    adding a user to the communication channel; or
    adding a file or other content to the communication channel.

17. One or more non-transitory computer-readable media storing instructions that, when executed by one or more processors, cause the one or more processors to perform operations comprising:
    receiving an instruction to create a communication channel on a communication platform, wherein the communication channel is associated with a first organization that is registered with the communication platform;
    sending, to a second organization, a request to join the communication channel, wherein the second organization is different than the first organization, wherein the communication channel is associated with a first set of permissions for the first organization and a second set of permissions for the second organization, wherein the second set of permissions are different than a third set of permissions associated with the second organization, wherein the first set of permissions and the second set of permissions are set by the first organization, and wherein the request to join the communication channel includes an indication of at least one of (a) an indication of the second set of permissions or (b) an indication that the second set of permissions is different than the third set of permissions;
    based at least in part on receiving a response to the request to join the communication channel, associating the second organization with the communication channel;
    receiving, from a second computing device associated with the second organization, a second request to perform an operation associated with the communication channel;
    in response to a determination, based at least in part on the one or more third permissions, that the operation is permitted, performing the operation associated with the communication channel; and
    in response to a determination, based at least in part on the one or more third permissions, that the operation is not permitted:
        sending, to the second computing device, an indication that the operation is not permitted;
        receiving, from the second computing device, a third request to override a permission, of the one or more third permissions, associated with the operation;
        sending the third request to a first computing device associated with the first organization;
        receiving, from the first computing device, an indication that the operation is permitted;
        based at least in part on receiving the indication that the operation is permitted, granting the second request to perform the operation; and
        sending the indication to the second computing device.

18. The one or more non-transitory computer-readable media of claim 17, wherein the second set of permissions indicate:
    whether information associated with the communication channel, as designated by the first organization, is viewable by the second organization;
    whether the second organization can modify privacy settings associated with the communication channel;
    whether the second organization can add one or more users or other organizations to the communication channel; or
    whether the second organization can add files or other content to the communication channel.

19. The one or more non-transitory computer-readable media of claim 17, wherein the second set of permissions indicate:
    one or more users who are permitted to add one or more other users or other organizations to the communication channel;
    one or more roles of users who are permitted to add one or more other users or other organizations to the communication channel;
    a retention policy associated with content associated with the communication channel; or
    that access to the communication channel is limited to verified users.

20. The one or more non-transitory computer-readable media of claim 17, wherein the second set of permissions is applicable to at least one of (i) all communication channels associated with other organizations that are different than the first organization, (ii) all users of the second organization, (iii) one or more specified users of the second organization, or (iv) the communication channel, and wherein the second set of permissions is defined by an administrator associated with the first organization or another user associated with the first organization.

* * * * *